US009602645B2

(12) United States Patent
Eaton et al.

(10) Patent No.: US 9,602,645 B2
(45) Date of Patent: Mar. 21, 2017

(54) SMART COVERING FOR MOBILE COMMUNICATIONS DEVICE

(71) Applicant: BlackBerry Limited, Waterloo (CA)

(72) Inventors: Eric Thomas Eaton, Lake Worth, FL (US); David Jeffery Hayes, Lake Worth, FL (US)

(73) Assignee: BlackBerry Limited, Waterloo (CA)

( * ) Notice: Subject to any disclaimer, the term of this patent is extended or adjusted under 35 U.S.C. 154(b) by 33 days.

(21) Appl. No.: 13/895,681

(22) Filed: May 16, 2013

(65) Prior Publication Data

US 2014/0342663 A1    Nov. 20, 2014

(51) Int. Cl.
*H04B 5/00*  (2006.01)
*H04M 1/04*  (2006.01)
*H04W 4/00*  (2009.01)

(52) U.S. Cl.
CPC ............ *H04M 1/04* (2013.01); *H04W 4/008* (2013.01); *H04M 2250/04* (2013.01)

(58) Field of Classification Search
CPC ............................... H04M 1/04; H04W 4/008
USPC ... 455/41.1, 41.2, 41.3, 575.3, 575.4, 575.1, 455/575.8
See application file for complete search history.

(56) References Cited

U.S. PATENT DOCUMENTS

| 8,111,144 | B2 | 2/2012 | Kirkup et al. | |
| 8,831,509 | B2* | 9/2014 | Moosavi | H04W 52/0251 455/41.1 |
| 9,020,428 | B2* | 4/2015 | Meunier | H04N 5/23229 455/41.1 |
| 2004/0180649 | A1* | 9/2004 | Vogel | H04M 1/72563 455/418 |
| 2005/0037825 | A1* | 2/2005 | Faranda Cordella | H01Q 1/245 455/575.9 |

(Continued)

FOREIGN PATENT DOCUMENTS

EP    1959332 A1    8/2008
EP    2194694 A1    6/2010
(Continued)

OTHER PUBLICATIONS

Android Forums, Any way to "auto-sleep" when placed in a holster/case, http://forums.androidcentral.com/samsung-galaxy-s3/181564-any-way-auto-sleep-when-placed-holster-case.html#post1865709, last accessed Mar. 22, 2013.
(Continued)

*Primary Examiner* — Md Talukder
(74) *Attorney, Agent, or Firm* — Ridout and Maybee LLP

(57) ABSTRACT

NFC-enabled systems and devices 110, 120, 950, and related methods 1400, for determining the orientation of an NFC-enabled mobile device within a covering 10. The orientation determination may include determining which way each face of an NFC-enabled mobile device 110, 120 is facing in the covering 10, and which end of the NFC-enable device is oriented in which way in the covering, through the use of particular arrangements of at least one NFC device attached to the covering and at least one NFC antenna of the NFC-enabled mobile device. By determining the orientation of the NFC-enabled device within the covering, the NFC-enabled device may then be configured for executing a particular command, such as to optimize some aspect of the NFC-enabled device based on the device orientation.

28 Claims, 14 Drawing Sheets

(56) References Cited

U.S. PATENT DOCUMENTS

| | | | | |
|---|---|---|---|---|
| 2009/0029750 A1* | 1/2009 | Infanti | A45F 5/00 | 455/575.8 |
| 2009/0312000 A1* | 12/2009 | Wakefield | H04M 1/7253 | 455/418 |
| 2010/0142126 A1* | 6/2010 | Dearden | A45F 5/00 | 361/679.01 |
| 2010/0167646 A1* | 7/2010 | Alameh | G06F 3/017 | 455/41.2 |
| 2011/0031287 A1* | 2/2011 | Le Gette | F16M 11/04 | 224/101 |
| 2011/0136552 A1* | 6/2011 | Lee | H04M 1/0245 | 455/575.3 |
| 2011/0212687 A1* | 9/2011 | Foster | H04M 1/72577 | 455/41.1 |
| 2011/0216093 A1* | 9/2011 | Griffin | H04R 3/12 | 345/659 |
| 2011/0308776 A1* | 12/2011 | Huang | H01L 23/3672 | 165/121 |
| 2012/0035989 A1* | 2/2012 | Abel | G06Q 30/0207 | 705/14.1 |
| 2012/0170177 A1* | 7/2012 | Pertuit | G01R 33/0023 | 361/679.01 |
| 2012/0208514 A1* | 8/2012 | Park | G06F 3/0484 | 455/418 |
| 2012/0220221 A1* | 8/2012 | Moosavi | H04M 1/274516 | 455/41.1 |
| 2012/0315844 A1* | 12/2012 | Cox | H04B 5/0031 | 455/41.1 |
| 2012/0315845 A1* | 12/2012 | Buczek | H04M 1/7253 | 455/41.1 |
| 2013/0017814 A1* | 1/2013 | Ali | G06F 1/1626 | 455/418 |
| 2013/0169545 A1* | 7/2013 | Eaton | H04M 1/0241 | 345/173 |
| 2013/0178174 A1* | 7/2013 | Geris | H04B 1/3838 | 455/90.3 |
| 2013/0196597 A1* | 8/2013 | Aldana | H04B 5/0081 | 455/41.1 |
| 2013/0200118 A1* | 8/2013 | Johnson | A45C 11/00 | 224/246 |
| 2013/0316690 A1* | 11/2013 | Wildner | H04W 8/22 | 455/418 |
| 2013/0331156 A1* | 12/2013 | Lui | A45C 11/00 | 455/575.8 |
| 2014/0187148 A1* | 7/2014 | Taite | H04M 1/7253 | 455/41.1 |
| 2014/0204511 A1* | 7/2014 | Oh | G06F 1/1632 | 361/679.01 |
| 2014/0273822 A1* | 9/2014 | Gutierrez | H04B 5/0031 | 455/41.1 |
| 2014/0274214 A1* | 9/2014 | Kim | H04M 1/0266 | 455/566 |
| 2014/0342663 A1* | 11/2014 | Eaton | H04M 1/04 | 455/41.1 |

FOREIGN PATENT DOCUMENTS

| | | |
|---|---|---|
| EP | 2474878 A1 | 7/2012 |
| EP | 2546722 A2 | 1/2013 |
| WO | 2011133506 A2 | 10/2011 |

OTHER PUBLICATIONS

European Patent Office, Extended European Search Report dated Oct. 21, 2013, issued in European Patent Application No. 13168147.00-1858.

* cited by examiner

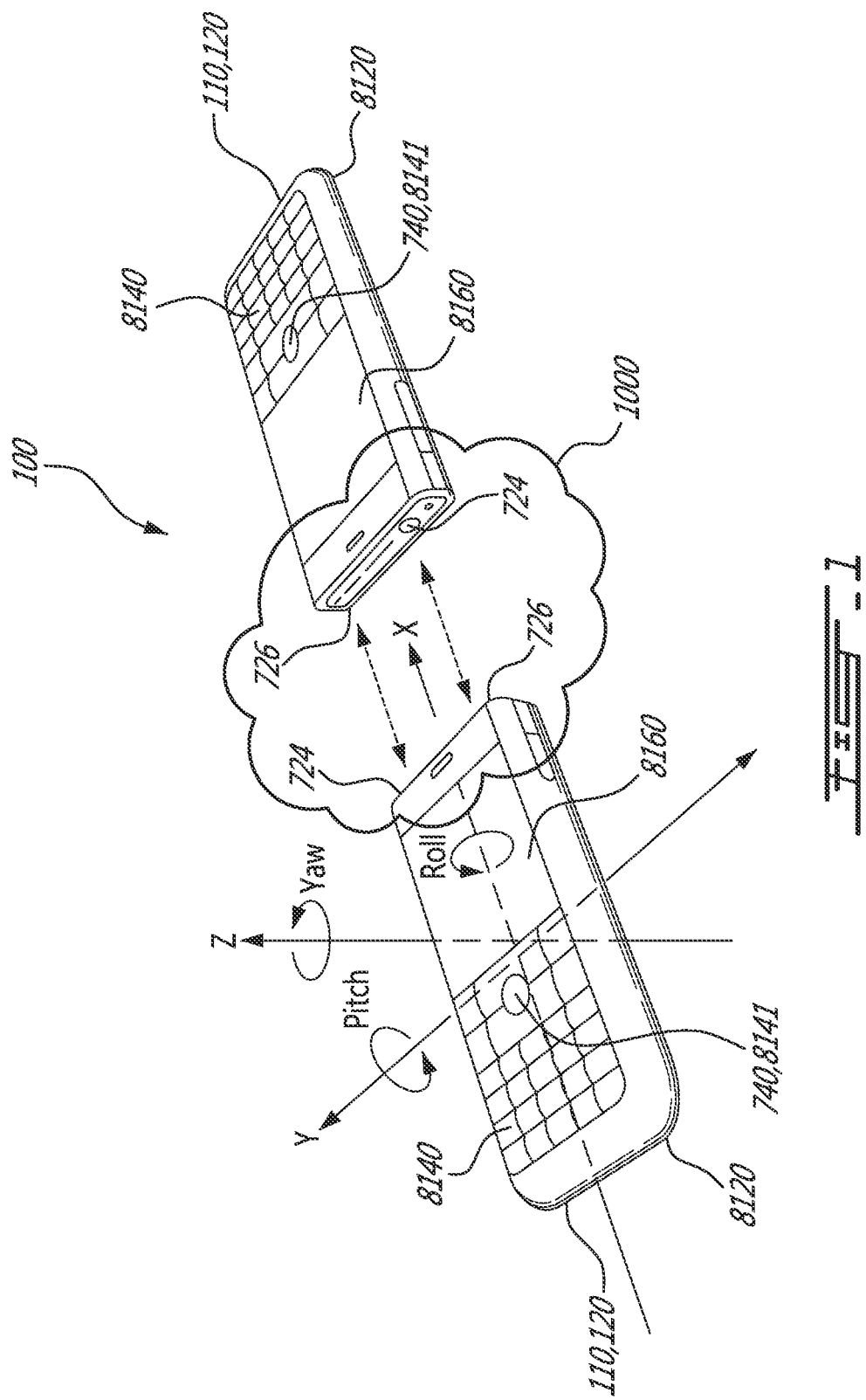

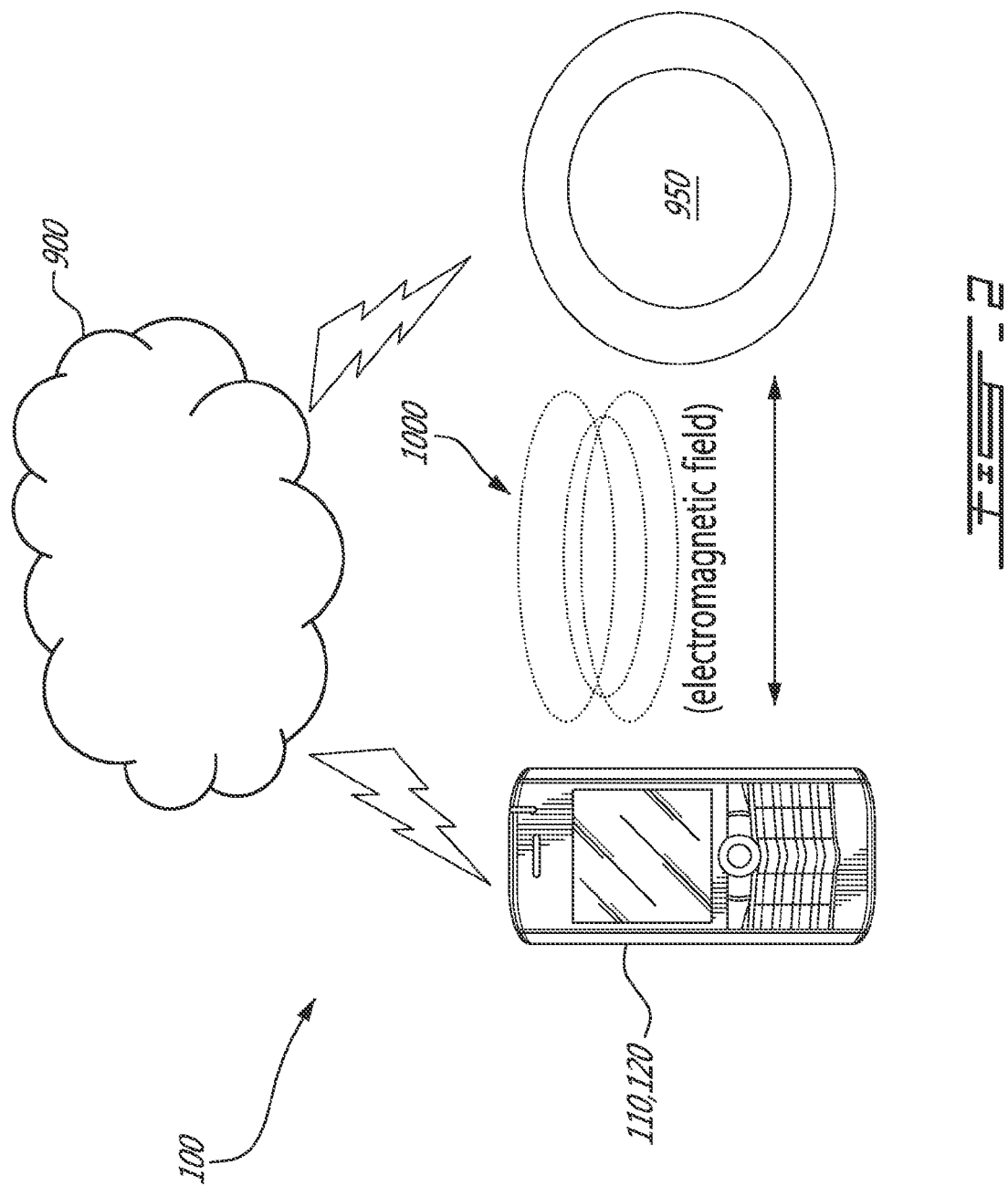

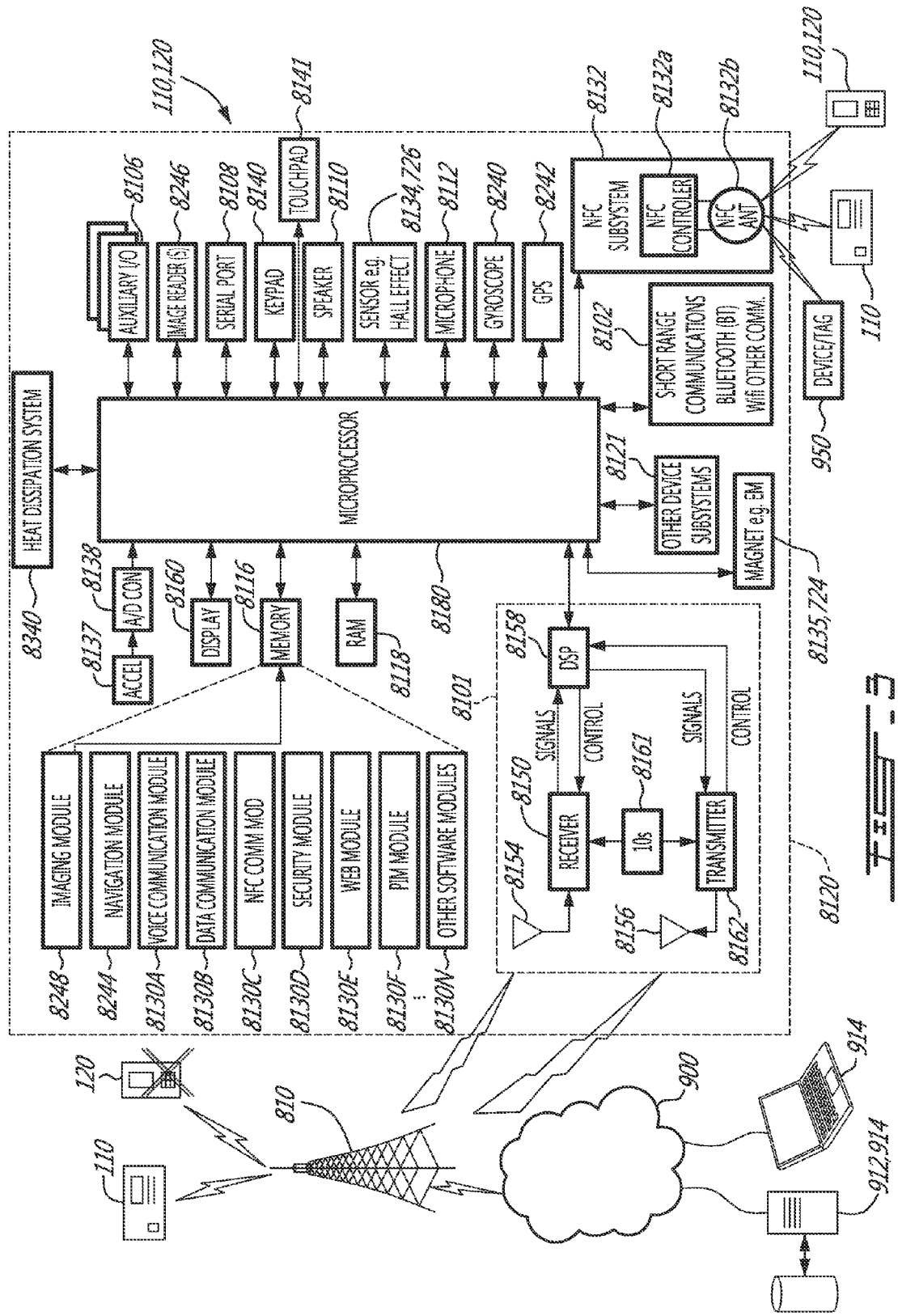

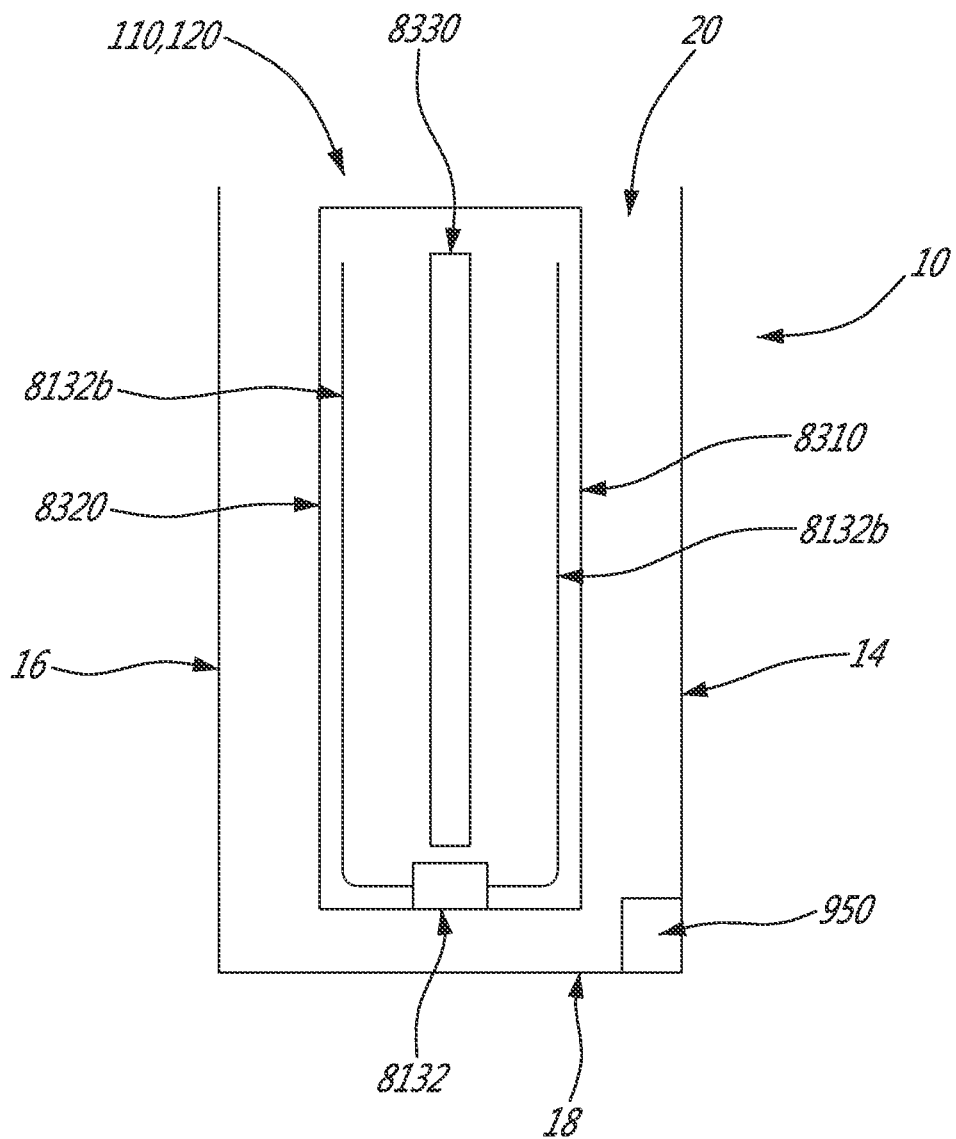

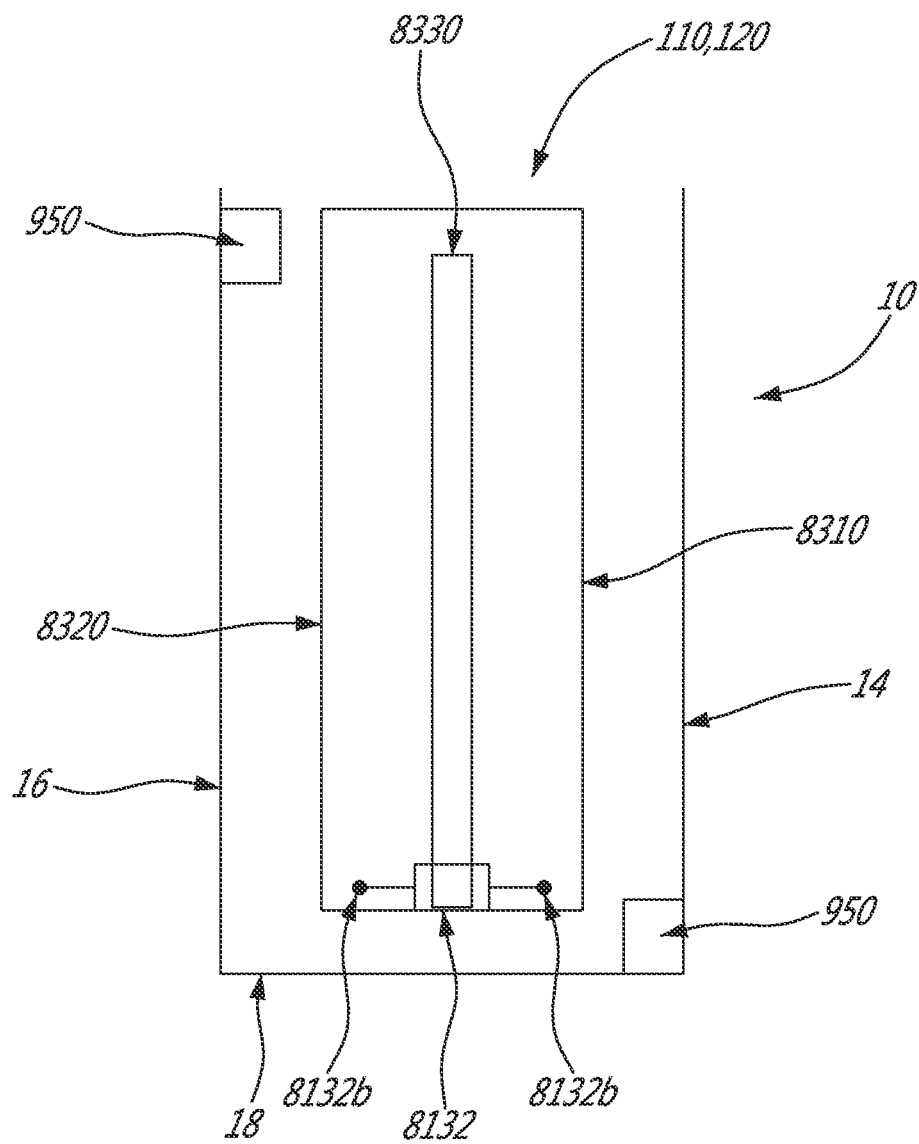

SMART COVERING FOR MOBILE COMMUNICATIONS DEVICE

FIELD OF THE DISCLOSURE

This application relates to the field of communications, and more particularly, to Near Field Communications (NFC) and other short range wireless communications protocols.

BACKGROUND

A recent trend in mobile communications has been to incorporate Near Field Communication (NFC) and other short-range wireless communications protocols into mobile devices and other communications systems and components. NFC and other short-range communications devices can initiate and execute fully and/or semi-automatic wireless data transfers by being brought into or otherwise placed in sufficiently close proximity, or in some embodiments by brief, controlled contact, or device "kissing."

Systems, devices, and methods adapted for NFC and other short-range communications processes can be applied in a wide variety of uses. Such uses can, for example, include the sharing of data files and other information.

Among further uses of NFC systems and devices, and related methods, is the management and control of devices, including handheld and other mobile computing and communications devices.

Accordingly, there is a need for further improved mechanisms and processes for controlling devices through NFC.

SUMMARY

In accordance with an aspect of the present invention there is provided a covering for an NFC-capable mobile device, the covering comprising: at least one NFC-readable data storage device, the at least one NFC-readable data storage device attached to the covering and comprising persistent memory readable by an NFC-capable mobile device, the persistent memory comprising data stored therein, the data configured to enable a processor of the NFC-capable mobile device to: determine, based at least partly on at least one data transfer between the NFC-capable mobile device and the at least one NFC-readable data storage device, an orientation of the covered NFC-capable mobile device within the covering, and based at least partly on the determined orientation of the covered NFC-capable mobile device within the covering, execute a device control command.

In accordance with another aspect of the present invention there is provided a NFC-capable mobile device comprising: a housing; at least one processor; at least one NFC communication system, comprising at least one antenna disposed in a known juxtaposition relative to the housing; and a medium or media including machine-readable instructions executable by at least one processor and configured to cause the at least one processor to: determine an orientation of the covered NFC-capable mobile device within a covering, based at least partly on at least one data transfer between the NFC communication system and at least one NFC-readable data storage device attached to the covering; and based at least partly on the determined orientation execute a device control command.

In accordance with another aspect of the present invention there is provided a method, performed by at least one processor of an NFC-capable mobile device, comprising: determining, based at least partly on at least one data transfer between the NFC-capable mobile device and at least one NFC-readable data storage device, an orientation of the covered NFC-capable mobile device within a covering; and based at least partly on the determined orientation of the covered NFC-capable mobile device within the covering, executing a device control command.

DESCRIPTION OF DRAWINGS

Examples of various aspects and embodiments of the invention are shown in the drawings, and described therein and elsewhere throughout the disclosure. In the drawings, like references indicate like parts.

FIGS. 1-13 are schematic diagrams of systems and devices useful in implementing various aspects of the disclosure.

DETAILED DESCRIPTION

Figure 4A:
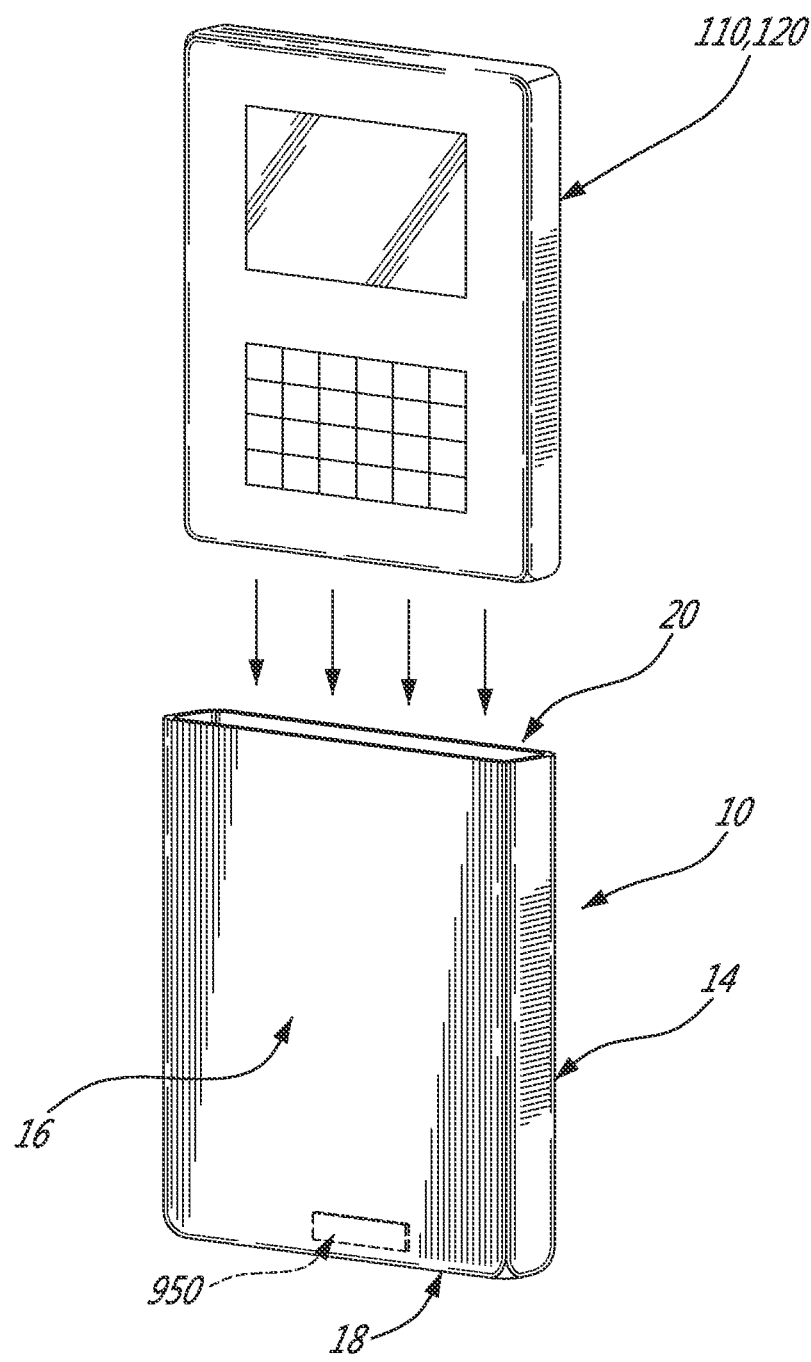

In various aspects, the disclosure provides systems, methods, devices, and computer programming products a NFC-enabled mobile device to determine its orientation within a covering. The orientation determination may include determining which way each face of the NFC-enabled mobile device is facing in the covering, and which end of the NFC-enable device is oriented in which way in the covering, through the use of particular arrangements of at least one NFC device attached to the covering and at least one NFC antenna of the NFC-enabled mobile device. By determining the orientation of the NFC-enabled device within the covering, the NFC-enabled device may then be configured for executing a particular command, such as to optimize some aspect of the NFC-enabled device based on the device orientation.

For example, in a first aspect, the disclosure provides a covering for an NFC-capable mobile device, the covering comprising: at least one NFC-readable data storage device, the at least one NFC-readable data storage device attached to the covering and comprising persistent memory readable by an NFC-capable mobile device, the persistent memory comprising data stored therein, the data configured to enable a processor of the NFC-capable mobile device to: determine, based at least partly on at least one data transfer between the NFC-capable mobile device and the at least one NFC-readable data storage device, an orientation of the covered NFC-capable mobile device within the covering, and based at least partly on the determined orientation of the covered NFC-capable mobile device within the covering, execute a device control command.

In another aspect, the disclosure provides a NFC-capable mobile device comprising: a housing; at least one processor; at least one NFC communication system, comprising at least one antenna disposed in a known juxtaposition relative to the housing; and a medium or media including machine-readable instructions executable by at least one processor and configured to cause the at least one processor to: determine an orientation of the covered NFC-capable mobile device within a covering, based at least partly on at least one data transfer between the NFC communication system and at least one NFC-readable data storage device attached to the covering; and based at least partly on the determined orientation execute a device control command.

In another aspect, the disclosure provides methods, performed by at least one processor of an NFC-capable mobile device, comprising: determining, based at least partly on at least one data transfer between the NFC-capable mobile device and at least one NFC-readable data storage device, an orientation of the covered NFC-capable mobile device within a covering; and based at least partly on the determined orientation of the covered NFC-capable mobile device within the covering, executing a device control command.

In other aspects, the disclosure provides computer program products having a non-transitory computer readable medium tangibly embodying computer executable code which, when executed by a processor of a NFC-enabled device or networked storage resource, causes the respective device or resource to perform the aforementioned methods.

Near-field communication(s) (NFC) are wireless communications between two or more suitably-configured devices when the devices are placed or otherwise disposed within a desired, typically relatively proximity to one another. Such communications can, for example, be initiated on a fully or partially automatic basis when the two or more devices are placed within desired proximity of one another, and can occur between any two or more of active and/or passive NFC devices.

As will be appreciated by those skilled in the relevant arts, once they have been made familiar with this disclosure, NFC communications in accordance with this disclosure can be conducted according to any suitable protocols, including a number of protocols now in widespread public use, as well as protocols yet to be developed.

In general, an NFC transaction, or data transfer, may be initiated by bringing two or more NFC-enabled devices into close proximity of one another. "Close proximity" can, as will be apparent to those skilled in the relevant arts, once they have been made familiar with this disclosure, mean any proximity suitable to a desired purpose, and typically means sufficiently close that it may be presumed that communications between the two or more NFC devices is desired. For current NFC applications, for example, "close proximity" can mean one or several centimeters, or shorter or longer distances, depending for example upon the purpose and nature of the NFC transaction and the NFC-enabled devices. The action of bringing such NFC-enabled devices into sufficiently close proximity may trigger automatic or semi-automatic activation of an NFC circuit, and/or an NFC communication. A NFC transaction, or NFC data transfer, may include one NFC-enabled device transferring data to the other, or two or more devices each transferring and/or receiving data from at least one of the other devices. Where devices both transmit and receive data from one another through an NFC transaction, this may be called a NFC data interchange.

For purposes of this disclosure, NFC communications may be conducted according to any desired wireless communications protocol(s), including for example those published or otherwise adopted by the various NFC and/or Radio Frequency Identification (RFID) industry federations, councils, groups, and boards, and their members, as well as any or all of Bluetooth or WIN wireless protocols, including for example any or all of Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), GSM, 3GPP, 4G, or other wireless protocols.

An example of an NFC system 100 suitable for use in implementing various aspects of the disclosure is shown in FIG. 1. In the embodiment shown in FIG. 1, system 100 comprises two active NFC devices 110, in the form of smartphones or other wireless handheld or mobile devices 120. Bringing active NFC-capable devices 110, 120 close enough together, by for example moving them physically toward each other into very close proximity, or into actual physical contact, can provide an operationally easy interface to set up, and initiate a wireless NFC connection.

For example, in the embodiment illustrated in FIG. 1, relative movement of the devices 110, 120 toward one another may induce the Hall effect in a magnetic field sensor incorporated within one or both of the devices, and so trigger execution of an NFC query and authorization process and, conditioned upon authorization, establishment of a uni- or bi-directional wireless communication session between the devices. In one non-limiting example, one or both of devices 110, 120 is provided with either a magnet 724 or a magnetometer, i.e., a magnet sensor 726, such as a Hall effect sensor or magneto-resistive sensor, or both. The devices 724, 726 may be matched in a single touch or other gesture adapted to bring the devices into suitably close proximity (sometimes termed a "kiss" gesture because the two devices 110, 120 typically touch or "kiss" each other or are very close and in adjacent proximity).

An example of a suitable proximity for such embodiments may be in the range of about 10 to 20 mm, but the range may be more or less depending on the strength of the magnets and the purposes for which the device(s) 110, 120 and/or system 100 is intended. The sensor(s) 726 on each device 110, 120 may be aligned to the magnet on the respective other device, as illustrated in FIG. 1. One or both of the sensors 726 senses ("sees") the corresponding magnet 724 pursuant to the Hall effect, causing a voltage variation or other signal to be generated by the sensor and transmitted to a processor, so as to activate an NFC circuit to communicate with the other device using the protocol of an associated NFC Stack or other wireless communication(s) subsystem or device(s). The devices 110 can then communicate with each other using any NFC protocol suitable for the intended purpose.

Establishment of NFC communications sessions between the devices 110, 120 can be conditioned on suitably-adapted authorizations, using, for example, PIN numbers and/or other security keys.

Interaction between active NFC devices 110 as shown, for example, in FIG. 1, can be considered peer-to-peer NFC interactions.

FIG. 2 illustrates an example of another NFC system 100 suitable for use in implementing various aspects of the disclosure. In the embodiment shown in FIG. 2, system 100 comprises an active NFC device 110, in the form of a smartphone or other wireless handheld or mobile device 120, and a passive NFC device 950 such as an RFID or other NFC tag, which may for example be attached to an NFC poster, or 'smart' poster. Bringing an active NFC-capable device 110, 120 close enough to a passive device 950 such as a tag embedded within or otherwise attached to a poster can cause query, authorization, and/or data transfer processes to fully or semi-automatically execute using magnets, Hall effect sensors, and/or other proximity-detecting mechanisms as described above and elsewhere herein.

A passive NFC device 950 in accordance with the invention can comprise memory(ies), including both volatile and persistent (i.e., non-transient) media for storing data readable by active NFC (i.e., wireless) device(s) 110, 112. Data stored by passive device(s) 950 and read by active device(s) 110, 112 can include any data suitable for desired purpose(s). For example, a passive device 950 affixed to an informational document such as an advertising or instructional poster can store, for reading by one or more active device(s) 110, any information desired to be imparted to the device(s) 110 and/or users thereof. For example, a device 950 affixed to an advertising poster can store information related to a product, such as an item of clothing, an entertainment event, or a food product purchasable by a user of a device 110.

Alternatively, or in addition, a device 950 can store data such as a uniform resource locator (URL) or other address information, such as a telephone number, readable by active device(s) 110 and suitable for directing a processor associated with the device(s) 110 to establish one or more uni- or multi-direction communications sessions with commonly-controlled and/or third-party resources via one or more networks 900, as shown in FIGS. 2 and 3.

Such networked resources can, for example, include vendor, enterprise, or other servers, computers, smartphones, etc.

In various aspects and embodiments of systems enabled by the various devices 110, 120, and components 950, etc., described herein, data may be made accessible, by reading, to a wide variety of NFC-capable devices. For example, data may be persistently (non-transiently) stored on any device(s) capable of holding data and making it available to active NFC device(s) 110, 120, etc. Such NFC-readable data storage devices can, for example, include suitably-configured active NFC device(s) 110, 120, and tags any other form(s) of passive NFC device(s) 950.

A somewhat more general embodiment of a system 100 for implementing aspects of the disclosure is shown schematically in FIG. 3. In the embodiment of FIG. 3, an active wireless handheld device 110, 120 is configured for communication with a wide variety of external devices via a number of communications (sub)systems. For example, using an NFC (sub)system 8132, the device 110 is configured to communicate with any one or more of passive NFC device(s) 950, such as RFID or other NFC tags; optionally non-mobile active device(s) 110, such as stationary computers or other devices, including for example vendor point-of-sale transaction devices); and/or NFC-capable mobile devices 120 such as smartphones and/or laptop, palmtop, and/or tablet computers.

As explained further below, the device 110, 120 shown in FIG. 3 is further capable, via wireless communications (sub)system 8101, of communicating with a wide range of devices, including for example server(s) 912 and/or other computers 914 via the internet, the public switched telephone network (PSTN) and/or other wired wide-area or local-area public or private network(s) 900, and/or one or more smartphones, computers 914, servers 912, and other active systems 110 via cellular and/or other wireless telephone networks. For example, an active NFC device 110, 120 may be communicatively coupled to one or more wireless local area networks (WLANs), such as a Wireless Fidelity (WiFi) network, or a wireless wide area network (WWAN) such as 3GPP or 4G Long Term Evolution (LTE) network (not shown). By way of non-limiting example, and as will be appreciated by those skilled in the relevant arts, WiFi is typically deployed as a WLAN that may extend home and business networks to wireless medium and may follow an IEEE 802.11 or other standard. A wireless communications connection may also be established using, for example, short-range communications subsystems which may include an infrared device and associated circuits and components as described above, or a Bluetooth communications module, to provide for communication with similarly-enabled systems and devices as well as the NFC communications.

FIG. 3 shows a non-limiting example of a range of various functional components that may be included in an exemplary handheld or other mobile wireless communications device 120. In the example shown, device 110, 120 includes, among other components, housing(s) 8120; input device(s) such as keypad(s) 8140, touchpads 8141/740, microphone(s) 8112, accelerometer(s) 8137, analog/digital (a/d) converter(s) 8138, touchscreen display(s) 8160, hall effect or other field/proximity sensor(s) 8134, 726, gyroscope(s) 8240, global positioning system(s) (GPS(s)) 8242, and optical or image reader(s) 8246, such as one or more digital still and video cameras and/or barcode readers, quick response (QR) readers, or other scanners; output device(s) such as touchscreen or other display(s) 8160, speakers(s) 8110, and magnet(s) or other field/proximity generator(s) 8135, 724; and input/output (I/O) device(s) such as uniform serial bus (USB) auxiliary input/output port(s) 8106, parallel or serial port(s) 8108, NFC (sub)system(s) 8132, including Bluetooth and/or other short-range communication (sub)system(s), and wireless/radio transceiver (sub)system(s) 8101.

As will occur to those skilled in the relevant arts, device(s) 110, 120 may include any of a wide variety of these and other components and (sub)systems, in any desired combination(s); and they may interact in any of a wide variety of ways, in addition to those described herein.

As will further be understood by those skilled in the relevant arts, handheld device(s) 120 can comprise any of a very wide range of mobile devices, including for example cellphones, smartphones, and other radio-based communications devices, as well as laptop, palmtop, and tablet computers. "Handheld" means portable and operable using one or both hands; and, in the case of smart phones, can but does not necessarily mean devices that are roughly the size of an average human palm.

One or more processors 8180, 8158, 8138, 8132(*a*), etc., working singly or in any desirable or otherwise suitable combinations, can use inputs generated and/or otherwise provided by any one or more of the various input device(s) input device(s) 8140, 8141/740, 8112, 8137, 8138, 8160, 8134/726, 8240, 8242, 8246, 8106, 8108, 8132, 8101 and locally and/or remotely-accessible peripheral devices, such as printers, servers, telephones, computers, etc., to generate, according to suitably-configured logic rules, output signals suitable for processing by any one or more of the various output device(s) 8160, 8110, 8135/724, 8106, 8108, 8132, 8101, and locally and/or remotely-accessible peripheral devices, etc.

Any or all of processor(s) 8180, 8158, 8138, 8132(*a*), etc., along with any other desired components and/or (sub)systems incorporated, by a device 120 may be protectively and/or functionally contained within housing 8120(*s*) coupled, as for example by means of suitably-configured buses, etc., between the various memory, input, output, and auxiliary devices (such as battery(ies), solar power generators, etc) in order to perform the functions disclosed herein. Processor(s) 8180, 8158, 8138, 8132(*a*) may be of any suitable form(s). For example, CPU(s) 8180 may comprise one or more microprocessors chip contained on or otherwise attached to one or more circuit boards within housing(s) 8120. CPU(s) 8180 can provide general command and control functions including, for example, operation of the display 8160, as well as the overall operation of the mobile device 810, in response to received information and inputs, such as in response to actuation of keys on the keypad 8140 by the user. Processors, 8158, 8138, 8132(*a*), etc., may be provided to control specialized functions such as operation of NFC and other particular communications channels.

Logic rules suitable for use by processors 8180, 8158, 8138, 8132(*a*) in generating such outputs can be accessed from any suitable locally and/or remotely located source(s), including, for example, any one or more applications modules 8130A-N, 8244, 8248, etc., as, for example, explained herein. Such rules and modules can be provided in any form(s) suitable for achieving the purposes addressed herein, including for example software instructions stored in transient (volatile) and/or non-transient (persistent) memory, firmware, and hard-programmed hardware device(s) or component(s).

Memory(ies) 8118, 8116, etc., which can be of any form compatible with the purposes disclosed herein, including, for example, flash, EEPROM, RAM, ROM, disk, register, etc., can be accessed, controlled, and otherwise used 8180, 8158, 8138, 8132(*a*), etc., for reading data used in the various processes described herein, for storing output so generated, and for holding executable forms of suitably-configured application and/or module instruction sets. Such stored data may, for example include operating system and other software executed by the processing device 8180.

As shown in FIG. 3, an active NFC device 110 can comprise multiple communications abilities, and thus may have the ability to conduct concurrent communications sessions with other devices 110, 950, 912, 914, etc., using NFC voice, and/or other communication means. For example, as illustrated, NFC capable device 110 may be engaged in peer-to-peer communication with a second NFC capable device 110, while also communicating with a baseband access point 912, 914, which may take the form of a cellular base station, for example.

Long-range (e.g., cellular) voice and/or text communications processes may be provided for an active device 110, 120 by one or more wireless communications subsystems 8101, comprising transmitter(s) 8152, 8156, receiver(s) 8150, 8154, and digital signal processor(s) (DSP(s)) 8158.

Short-range communications may be provided by either or both of NFC subsystem(s) 8102, 8132, which may or may comprise dedicated antenna systems for short-range aspects; specialized memory device(s) 8116, 8118, and other device subsystems 8121.

Mobile device(s) 110, 120 in accordance with the disclosure may therefore be considered, in the examples shown, example, two-way RF communications devices having voice and data communications capabilities using RF circuitry. In addition, the mobile device 110, 120 may have the capability to communicate with other computer systems 110, 912, 914, etc., via the Internet or other network(s) 900. For example, a device 110, 120 may communicate with one or more servers 912, such as Internet servers, via RF subsystems 8101 and the associated components, including web module 8130*e*, and further via short-range communications subsystem(s) 8102, such as via web/browser module(s) 8130*e*. System(s) 8102 may include, for example, one or more Bluetooth communications modules for establishing Bluetooth wireless connection(s), and other communications modules, such as infrared modules or devices, WiFi circuits and modules, and associated components and circuits that may also form part of the RF circuitry.

A predetermined set of applications that control basic and optional device operations, such as data and voice communications 8130A and 8130*6*, may be installed on the device 110,120 during manufacture. Application modules 8130A-N may include native and non-native modules for security 8130D, Web interaction 8130E, social interactions or applications, and the like.

NFC communications module(s) 8130C may include hardware and/or software to enable NFC controller(s) 8132A (which may themselves include hardware, software, and firmware a required) and with the microprocessor 8180, to perform NFC communications tasks, such as through the memory 8116, NFC communications module(s) 8130C may, in various embodiments, support responsive operability for tag 950 reads/writes, whether virtual or physical, by interacting with other modules and apps to affect data stored on tag(s) 950, and/or to obtain or write tag data. Such other modules may for example include web module 8130E, PIM module 8130F, and other software modules 8130N (such as apps and video players, by way of non-limiting examples). Microprocessor(s) 8180 may also cooperate with NFC module(s) 8130C, and with NFC subsystem(s) 8132, which may include one or more NFC chips comprising NFC controller(s) 8132*a*, and antenna(s) 8132*b* to facilitate communications with other active and/or inactive NFC device(s) 110, 950, as discussed herein. For example, an NFC communications module 8130C may allow a microprocessor 8180 to control the NFC subsystem 8132 and/or memory stores 8116, 8118.

NFC chips suitable for use in implementing aspects of the disclosure may, for example, comprise one or more PN531 microcontroller-based transmission modules produced by Koninklijke Phillips Electronics N.V. Such NFC chips 8132*a* may, for example, include both digital and analog circuitry, and one or more contactless Universal Asynchronous Receiver Transmitters (UARTs), cores, and host interfaces. Incorporated circuitry may include output drivers, integrated demodulators, bit decoders, mode detectors and RF-, magnetic, and/or level detectors as suitable. Suitable contactless UARTs may include elements for data processing, Cyclical Redundancy Checking (CRC), parity generation, framing generation and check bit coding and decoding, and/or other functions. Cores may, for example, include one or more 80051 microcontroller, 32 Kbytes or other amounts of ROM and, one Kbyte or other amounts of RAM, for example. A set of host interfaces may interface with the microprocessor and interface according to such known standards as I2C, serial UART, SPI and USB. NFC circuits may be tuned to any frequency(ies) suitable for accomplishing the purposes disclosed herein, as for example about 13.56 MHz.

NFC (sub)system(s) 8132 may include and/or otherwise cooperate with one or more magnets/magnetometers or other magnet sensors 8134, such as Hall effect sensors, communicatively connected to the microprocessor 8180, 8132*a*. Sensor(s) 8134 may include components suitable for operation as a Hall effect sensor, including any necessary coils or other circuits. There is also illustrated a magnet/magnetometer 8135 that, in various embodiments, may be advantageously be provided in the form of one or more electromagnets and may operates with microprocessor(s) 8180, 8132*am* etc., to allow one or more alternate communications pathways using electromagnetic energy, which may be changed to correspond to changing data. Electromagnet(s) 8135 may perform a variety of different functions, including working as an active or passive device in association with other components of the device 110. For example, when an electromagnet 8135 is used instead of a permanent magnet (non-electromagnetic) in the devices of FIG. 3, a pulse of energy may be delivered to the Hall effect sensor in another device. The other device receiving the pulse may accordingly activate its NFC circuit. A WiFi connection, for example, in the alternative may be established if an NFC and/or Bluetooth connection is not established. Other modules 8130N may include, for example, software that interoperates with the magnetic sensor 8134 and any magnet or electromagnet 8135 or other magnetic circuitry that may be included within the overall electromagnet 8135.

In addition, personal information manager (PIM) application module(s) 8130F may be or include one or more native modules installed during manufacture. PIM(s) 8130F may be capable of organizing and managing data items, such as email, contacts, calendar events, voice mails, appointments, and task items. The PIM application is also capable of sending and receiving data items via a wireless network. The PIM data items are seamlessly integrated, synchronized and updated via the wireless network with the device user's corresponding data items, such as may be stored in the cloud or as may be associated with a host computer system, for example.

Communication functions, including data and voice communications, may be performed through the communications subsystem 8101, and/or through the short-30 range communications subsystem 8102, which may be part of the circuitry contained in device 810. The specific design and implementation of the communications subsystems 8101 and 8102 may be dependent upon the communications network in which the mobile device 810 is intended to operate.

Such communication functions may, as referenced above, be carried out by data module 81306, voice module 8130A, and web module 8130D, including at the instruction of NFC module 8130C in accordance with the disclosed embodiments, with security for these communications, such as in the granting of access to PIM module 8130F, overseen by a security module 8130D. A security module 8130D may include one or more native or non-native security applications, including anti-virus/anti-malware applications or functions, and protection of PIM information via applications or functions, during external interactions, may occur via NFC or via the Web, for example. Accordingly, security module 8130D may allow for degrees of security in interacting with other devices, such as the aforementioned tags, and/or other devices such as servers (herein defined to include any device acting as an Internet, intranet, extranet, or other public or private network node, host, server, or the like), and particularly with devices or aspects of a device that enable the occurrence of communication exchanges by the device occur over a network, such as the Internet.

As previously noted, NFC processes may be conducted according to any of a wide variety of wireless, short-range communications protocols. Such protocols typically comprise sets of standards to enable devices 110, 120, such as smartphones and the like, to establish radio communication with each other by bringing them into close proximity, or by touching them together. Applications include wireless data transactions and simplified setup of communication sessions involving other communication technologies, such as Wi-Fi and Bluetooth. Communication is also possible between a powered NFC device and a powered or unpowered NFC "tag" or button. Suitable standard currently in use are have been p promulgated by the NFC Forum, which was founded in 2004 by Nokia, Philips and Sony, and which now has more than 160 members. The NFC Forum also promotes NFC and certifies device compliance.

Standards have been developed that cover both NFC Forum-sanctioned communication protocols and other short-range wireless data exchange (NFC) formats. Specifically, an example of NFC standards ISO/IEC 18092/ECMA-340; Near Field Communication Interface and Protocol-1 (NFCIP-1); ISO/IEC 21481/ECMA-352; and Near Field Communication Interface and Protocol-2 (NFCIP-2). NFC also encompasses a variety of pre-existing standards including ISO/IEC 14443 both Type A and Type B, and FeliCa. The standards specify the NFC air interface, modulation schemes, coding, transfer speeds, and frame format of the RF interface of NFC devices. The standards also comprise initialization schemes and conditions required for data collision-control during initialization for both active and passive NFC modes. In addition, they define a transport protocol, including protocol activation and data-exchange methods.

NFC protocols sanctioned by the NFC forum typically operate within a globally available and unregulated radio frequency band of 13.56 MHz, and generally have a working distance of up to about 20 centimeters. Three data rates are currently defined in the NFC standards: 106 kilobits per second (kbit/s); 212 kbit/s; and 424 kbit/s.

In addition, the NFC Forum has defined a common data format called NFC Data Exchange Format (NDEF), which can store and transport various kinds of items, such as MIME-typed objects and URLs. The NFC Forum also added the Simple NDEF Exchange Protocol for sending and receiving messages between two NFC-enabled devices.

All of the above-mentioned standards and formats, along with any other existing and applicable NFC standards, are incorporated herein by reference as if fully set forth in their entirety, in their finalized condition.

Both passive and active communications modes have been defined. In active communication modes, both an initiator device and a Target device may generate their own NFC fields 1000 (see e.g., FIGS. 1 and 2). The initiator device may start the NFC communication, with the target device responding to commands received from the initiator device, as appropriate, by modulating the NFC field 1000 generated by the Target device.

Between two active NFC devices 110, either or both devices can act as either initiator or target. In passive communication mode, one of the devices lacks, or does not employ an ability to independently create an electro-magnetic NFC carrier field 1000, and therefore generally does not serve as an initiator.

As previously noted, among the many uses to which NFC systems and devices, and related methods, can be put is the control of handheld and other mobile communication and computer systems, including for example device(s) 110, 120.

As noted above, passive and other NFC-readable data storage devices such as tag(s) 950 may be attached to or otherwise disposed upon any surface(s) or object(s). When an active NFC-capable mobile device 110, 120 is brought within sufficiently close range of a passive NFC device 950, the active NFC device 110 may read from the passive device 950 data which directs the NFC-capable mobile device 110, 120 to execute one or more instructions or commands in order to control one or more aspects of the operation of the device 110, 120. For example, an NFC device 950 located in a particular environment, such as an office, or an automobile, may store data useful for directing a device 110, 120 to activate a mode of operation appropriate or designated for that respective environment. For example, one or more machine-executable control commands, or instructions, may be stored on the device 950, and/or the device 950 may provide address information useful for directing the device 110, 120 to a networked resource 912, 914, etc., associated with such commands.

Figure 4B:
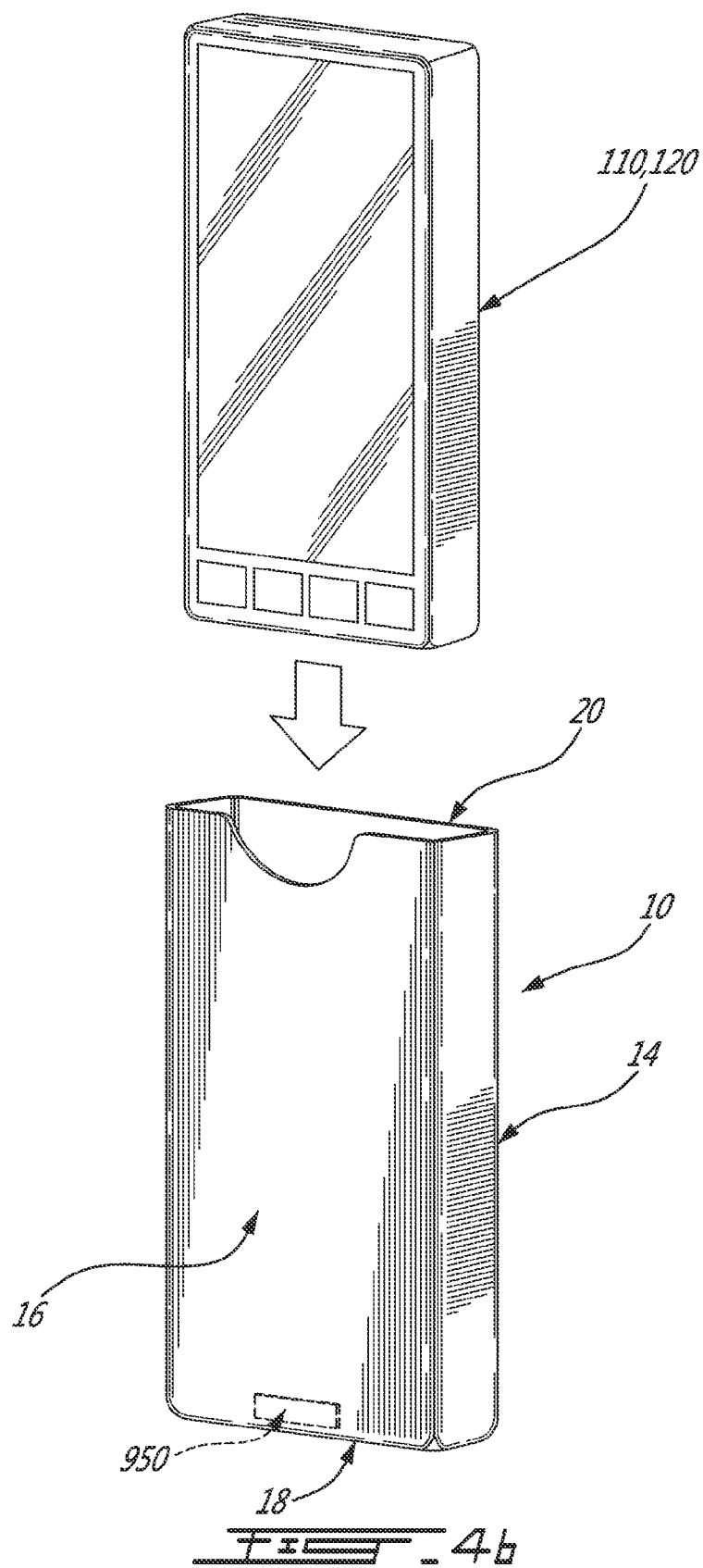

As a further particular example, and an example which can be of significant advantage for a wide number of reasons and in a wide number of circumstances, a mobile device 110, 120 may be stored in a covering 10, such as a holster, case, sheath, or other protector, as shown in FIGS. 4*a* and 4*b*. For use, the device 110, 120 may be removed from the covering 10, used for any of the wide variety of purposes enabled by the various systems, subsystems, and components described above, and then placed back into or within other close proximity to the covering 10 when the device 110, 120 is no longer actively being used. In accordance with the present disclosure, one or more NFC devices 950 may be embedded within, or otherwise attached to, covering 10 and programmed with data that, when read by the device 110, 120, directs the device 110, 120 to execute one or more specified commands when the device 110, 120 is placed within the covering or otherwise brought into sufficiently close proximity to it. Moreover, by appropriate placement of the NFC device(s) 950 on or within the case 10, commands executed in such conditions can cause different commands to be executed, based wholly or partly on an orientation of the device 110, 120 within the case 10 as it is inserted and/or after it has been stored within the case.

By embedding one or more NFC devices 950 within, or otherwise attaching them to, specific location(s) on or within, or in specific orientation(s) or juxtaposition(s) relative to the case and/or to each other, so that as a device 110, 120 is placed within the case 10, the attached NFC device(s) 950 are placed into, or pass through, particular relative orientation(s) or juxtaposition(s) with respect to the device 110, 120, and/or its NFC (sub)system(s) 8102, 8132, or portions thereof, including any associated NFC antennas, the NFC device(s) 950 may be used to instruct processor(s) 8180, 8158, 8138, 8132(*a*), etc., of the device 110, 120 to implement any of a wide variety of desired commands. For example, based on such a determined orientation of a device 110, 120 within a case 10, the device's processors 8180, etc., may be caused to cause various systems, subsystems, or components of the device 110, 120, to be provided with altered power settings, or otherwise subjected to altered operating conditions. For example, one or more antennas, displays, speakers, or other input and/or output devices of an NFC (sub)system 8102, 8132 may be powered down, or off, or may be placed into any other desired operating condition(s).

As will be appreciated by those skilled in the relevant arts, any desired command(s) may be executed, based wholly or partially on such determined orientations. For example, in addition to powering up or powering down various (sub) systems or components of a device 110, 120, executed commands may be used to alter alert, communications, or other states of the device, so as for example to put a device into any desired 'sleep' mode, which mode(s) may be associated uniquely with a home, office, or other location, time of day, day of week, and/or any other condition.

As will be further understood by those skilled in the relevant arts, once they have been made familiar with this disclosure, command(s) executed by a device 110, 120 upon placement within a covering 10 comprising embedded or otherwise attached NFC device(s) 950 may be fully or partially configurable by a user of the device, and/or by any other authorized persons, including for example managers, IT personnel, and other administrators. For example, by accessing an NFC tag-writing application on a mobile device 110, 120 and/or a desktop or other computer, a user of an NFC-capable device 110, 120 can configure tag(s) 950 to cause the device 110, 120 to execute any desired action(s) on insertion into a covering 10, and such action(s) may vary, depending upon the front/back top/bottom orientation of the device upon being placed in the covering.

Among other advantages offered by systems and methods in accordance with the disclosure, a user of a device 110, 120 can cause a device 110, 120 to activate any desired mode or state upon being placed within, or removed from, a covering 10, dependent wholly or partially on the orientation of the device 110, 120, while within the covering 10. For example, a user of such a device can place a device 110, 120 in a "home sleep" mode by placing it in a front-outward orientation, so that a front 20 of the device is adjacent to a front 16 of the covering 10, and in an "active office" mode by reversing it to that the back 18 of the device is adjacent the front 16 of the covering. A wide range of profile-setting options may be used, depending upon orientation, time of day, and application setting(s) active in the device at the time of placement in the covering 10.

For example, as shown in FIG. 4*a*, a device 110, 120 may be placed into a case 10. As the device 110, 120 is placed into the case, an NFC (sub)system 8102, 8132 of the device 110, 120 can be brought into such proximity to a passive NFC device embedded in a lower portion 18 of the case that the NFC (sub)system can read data stored on the device 950. Based on such reading of data stored on the device 950, as described herein, processor(s) 8180, etc., of the device 110, 120 can determine that the device is stored in the case 10 in the relative orientation shown, with a surface or face of the device 110, 120 which includes a display screen, keyboard, etc., proximate a rear face 16 of the case 10 and the bottom or lower end of the device proximate the bottom or innermost portion 18 of the case 10.

Based on the determination that the device 110, 120 is in such a rear-facing, upright orientation, processor(s) 8180, etc., of the device can for example cause the NFC (sub) system(s) 8102, 8132, and any associated transmitters, antennas, etc., to be placed in a power-off or reduced power state (i.e., a "sleep state") so that battery power is not used at a full rate and/or electromagnetic emissions from the device 110, 120 are reduced, etc.

Non-limiting examples of commands executed in accordance with a determined orientation of the device 110, 120 within the covering 10 may include reducing and/or otherwise modifying power supplied to one or more hardware components of the device 110, 120, such as receivers 8154, or transmitters 8156, or any antenna component of the device 110, 120. Similarly, a hardware component of the device 110, 120 (such as an antenna 8154, 8156, speaker 8110, light, or display screen 8160) may be disabled entirely or partially, or designated not to be used, or the device 110, 120 may enter a predefined reduced-power state, such as a "standby" mode. Commands executed in accordance with a determined orientation of the device 110, 120 may include modifying an operation or other function of a hardware component of device 110, 120. The function modified may include varying the power delivered to the respective component or modifying a control function of the respective component. A component may be directed by the device 110, 120 to function in a particular way based on the determined orientation of the device 110, 120. Hardware components may be disabled, deactivated, or activated based on the determined orientation.

Where the device 110, 120 is determined to be facing in a particular direction (e.g., "frontward" or "backward") in the covering 10, and the covering 10 has a preferred orientation when worn or carried by a user (such as a holster with a clip worn on a belt of the user), the device 110, 120 may determine, based on a simple assumption, that the clip side of the holster covering is closer to the user's body. This may be accomplished by configuring the device 110, 120 to determine that a front side of covering 10 will be placed facing away from the user's body as the covering 10 holster clip, attached to the rear side of covering 10, is located closer to the user's body. Knowledge or determination of the orientation of the device 110, 120 relative to the user's body may be used to control operation of, for example, a multiple-input/multiple-output (MIMO) or directional antenna of device 110, 120. For example, if the orientation of the device 110, 120 within the holster covering is known, then any antennas located away from the body can use normal power or a normal antenna tuning or matching pattern, or simply be activated, while other antennas may be deactivated. If the device 110, 120 antennas are closer to the body, or oriented to direct signals in the direction of the body, a modified tuning or selection of different antennas in the MIMO structure can be used to minimize specific absorption rate ("SAR"), a measure of the rate at which energy is absorbed by the body when exposed to a radio frequency ("RF") electromagnetic field, and possibly improve coverage. Accordingly, radiation can be directed away from the user's body. If the device 110, 120 has multiple antennas capable of performing similar functions, in particular where one of the antennas is capable of operating at a lower power than the other antennas, then the device 110, 120 may activate the lower-power antenna based on the determined orientation of the device 110, 120 within the covering 10.

Further examples of command(s) executable by a device 110, 120 based on a determined orientation of the device 110, 120 within a covering 10 include: (i) using a side speaker on an end of the device 110, 120 nearest an opening in the covering 10 (e.g. top end 20) when playing alerts (e.g. incoming call ring tone); (ii) where multiple indicators are present on the device, activating (e.g. blinking) only the indicator nearest an opening in the covering 10 (e.g. closest to the top end 20 of the covering 10); (iii) illuminating icons on the device 110, 120 only near the end of the display screen 8160 nearest an opening in the covering 10 (e.g. nearest the open top end 20), for example, to enable a quick glance; (iv) porting heat to an end of the device near an opening in the covering 10 (e.g. near the open top end 20 of the covering 10), optionally using Peltier heat pumps; (v) for a device 110, 120 with at least one display screen on each of a rear side 8310 and front side 8320, activating only one the screen facing the user when the device 120, 120 is removed from covering 10; and (vi) provide an alert indication (e.g. audio tone, blink an indicator light, shake the device 110, 120, or other indication) when the device 110, 120 is not orientated in the covering 10 in a preferred orientation. As will be understood by those skilled in the relevant arts, once they have been made familiar with this disclosure, these and other commands may in some circumstances be used with particular advantage where mobile devices 110, 120 are generally or substantially symmetrical in shape, as is the case with many touch screen devices, but where hardware components are located at different locations on or within the housing 8120 of the device 110, 120.

As mentioned, commands executed by a device 110, 120 based on orientation of the device relative to a case 10 may, among other possibilities, be configured to control heat distribution within the device 110, 120. This may be possible through the use of a heat dissipation system 8340 of the device 110, 120. Heat dissipation system 8340 may comprise at least one front heat pump disposed proximate a front face 8220 of the device 110, 120 and at least one rear heat pump disposed proximate a rear face of the device 110, 120. In operation, upon determining the orientation of the device 110, 120 within the covering, one of the front heat pump and rear heat pump located farther away from the user or directed away from the user may be used to dissipate heat away from the device 110, 120 and the user. Dissipating heat from device 110, 120 away from the user may be preferable, for example, with respect to the comfort of the user, and also to dissipate heat from the device 110, 120 more efficiently, as air around the device 110, 120 may be more effective at dissipating heat from the device 110, 120 than the user's body.

Where a covering 10, device 110, 120, and/or (sub)system or component associated with device 110, 120 includes the capability to change appearance, such as with a Reflex® liquid crystal display ("LCD"), the device 110, 120 may control the operation of the Reflex LCD display to display a graphic, solid colour, or text in accordance with the determined orientation of the device 110, 120 within the covering. For example, where the device 110, 120 includes a Reflex LCD display connected to an outer service of the house 8120, the device 110, 120 may direct the Reflex LCD display to change color when the device 110, 120 is inserted into the covering 10. When the device 110, 120 is oriented facing away from the user's body in the covering 10, the device 110, 120 may control the Reflex LCD display to change its color to a first color, and when removed from the covering 10 the device 110, 120 may control the Reflex LCD display to changes it color to a second color.

One or more NFC devices 950 may be attached to a surface of the covering 10 and/or embedded within the covering 10. In various embodiments, at least one NFC device 950 is placed in a location proximate an end or edge 18, 20, etc., of the covering 10. For example, one NFC device 950 may be placed near an entry opening or top 20 of the covering, or at an opposite location thereto, such as at the bottom 18 of the covering 10. Each NFC device 950 may be attached to an inner surface or outer surface of the covering 10. Each NFC device 950 may be removably attached to the covering 10 by adhesive, or other mechanism of non-permanent attachment; and/or such devices may be embedded within the covering 10, as for example by molding, sewing within a seam or between layers of leather or other material, etc.

As described previously, an NFC subsystem 8132 may include one or more NFC antenna(s) 8132b. Each NFC antenna 8132b may be attached to the device 110, 120 housing 8120 or otherwise disposed inside or outside the housing 8120. Each antenna 8132b may be positioned at generally specific locations of the housing 8120, or may be disposed along all or part of a surface or side of the housing 8120. In embodiments in which an antenna 8132b is located at, or proximate to, a particular location of the housing, it is commonly preferable that that location or portion of the housing 8120 be positioned near NFC device 950 to facilitate communications with the NFC device 950. Where an antenna 8132b extends along a length of a side of the housing 8120, the antenna 8132b may communicate with a NFC device 950 where any part of the respective side of the housing 8120 is positioned near the NFC device 950. Each antenna 8132b may be capable of communications with a respective nearby NFC device 950 independently of any other antenna 8132b.

Figure 5:
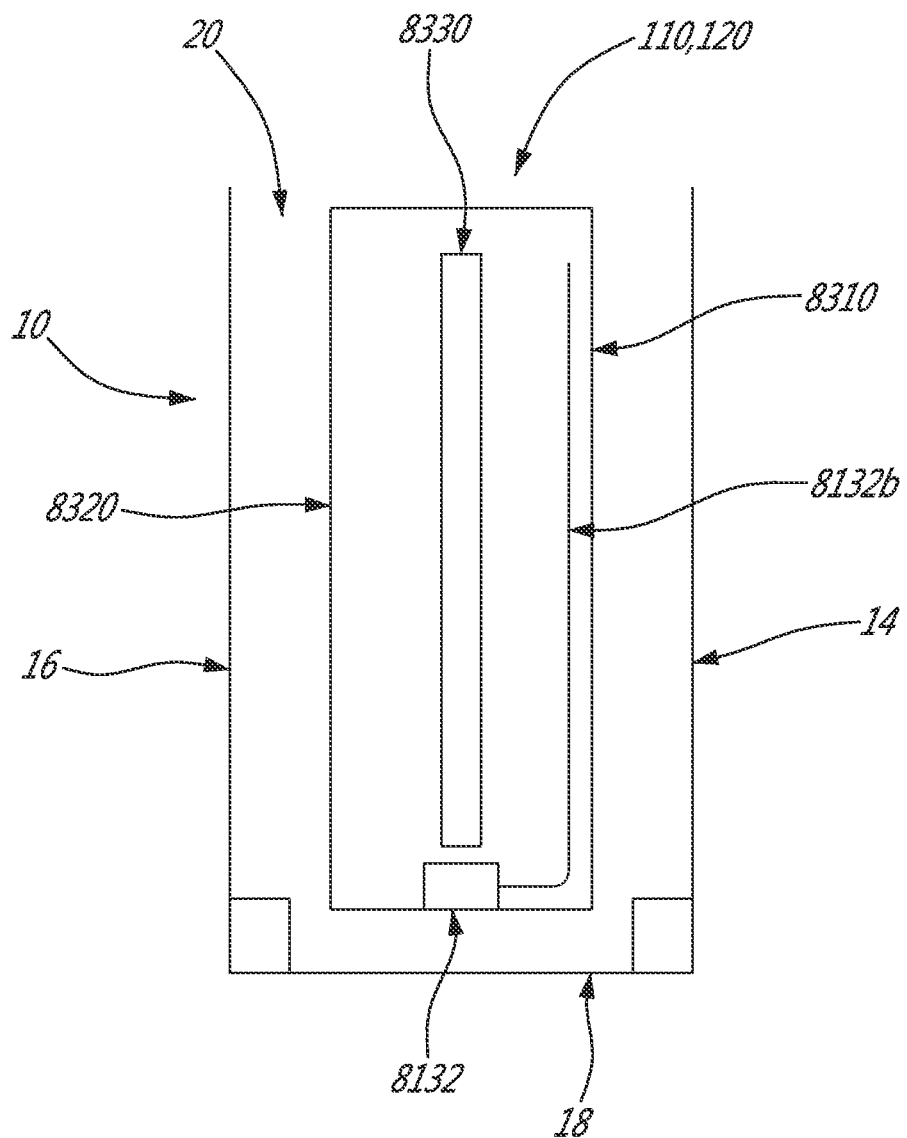

As shown for example in FIG. 5, some or all components of NFC (sub)system(s) 8132 of a device 110, 120 and particularly any antenna(s) 8132b thereof, may typically be positioned on one side of a battery 8300 of the device 110, 120, optionally proximate a rear side of housing 8120. In such circumstances the battery 8300 and/or related battery components, and/or other non-battery components may act as shielding by, for example, deflecting, reducing or effectively blocking electromagnetic fields or radiation produced by the antenna(s) 8132*b* from emanating through or toward the front 8320 of the device 110, 120, and instead radiate, extend, or otherwise emanate from a rear 8130 of the device 110, 120. Dedicated, special-purpose, and/or other shielding may also, or alternatively, be provided, or otherwise exist, within a device 110, 120. By arranging NFC (sub)system 8132, and in particular any NFC antenna(s) 8132*b*, on one or either side of the shielding, it is possible to determine the general orientation of communication(s) between the NFC subsystem 8132 and one or more NFC device(s) 950 embedded within or otherwise attached the covering 10.

Shielding 8330 may comprise any suitable material(s) of any suitable shape(s), disposed in any configuration(s) suitable for attenuating, blocking, or otherwise affecting NFC and/or other communication signals generated by NFC (sub)system(s) 8132. Shielding 8330 may also comprise more than one distinct shielding element not necessarily all connected to one another. Shielding 8330 may comprise ferrite, or other electromagnetic interference ("EMI") or radio-frequency interference ("RFI") shielding material.

As an alternative to shielding 8330, or in addition to the use of shielding 8330, NFC (sub)system(s) of device(s) 110, 120 may employ one or more directional antenna(s) 8132*b*. Where an NFC antenna 8132*b* comprises a directional antenna, the directional NFC antenna 8132*b* may be directed towards a general direction where NFC device 950 can be expected to be.

For example, an NFC antenna 8132*b* at the rear of device 110, 120 may be directed towards the rear of the device 110, 120, while a NFC antenna 8132*b* at the front 8320 of device 110, 120 may be directed towards the front of the device 110, 120. In such configurations, each antenna 8132*b* may only detect NFC data signals from the specific or approximate direction in which each antenna 8132*b* is respectively pointed, thus reducing or eliminating need for shielding 8330 of a particular configuration or disposition. Accordingly, in the exemplary implementations described herein, where an antenna 8132*b* is described as being shielded by battery or other shielding 8330 to only detect NFC signals from a particular direction, it is to be understood that a directional antenna 8132*b* may be used instead oriented in that particular direction.

Typically, a device 110, 120 requires some type of input in order to determine that it has been partially or fully inserted into or covered by covering 10, and/or what orientation it is in, relative to the covering, once it has been inserted. As will be explained in, for example, the examples that follow, through the use of NFC device(s) 950 attached to the covering 10, an NFC-capable device 110, 120 may be configured to determine the orientation of the device 110, 120 in the covering 10, and additionally whether the device 110, 120 is fully covered by the covering 10, by reading data stored on the device(s) 950.

Figure 14:
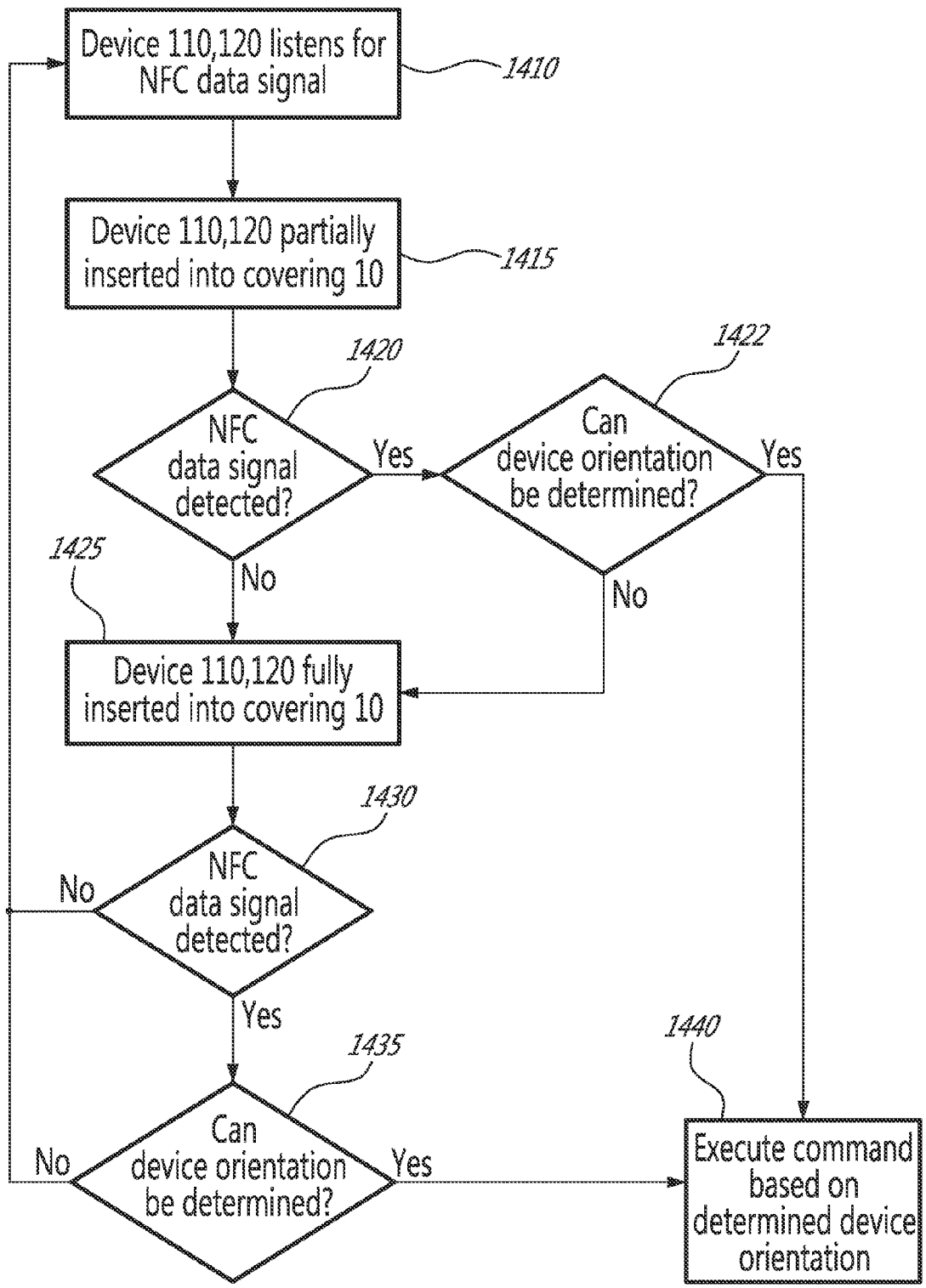
FIG. 14 is a schematic flow diagram of an example of a process suitable for use in implementing various aspects of the disclosure.

FIG. 14 shows an example of a method 1400 suitable for execution by an NFC-capable device 110, 120 in determining its orientation within a covering 10 comprising one or more embedded or otherwise attached NFC device(s) 950, and optionally executing any desired commands based wholly or partially upon the determined orientation.

At 1410, the device 110, 120, is located outside the covering 10 and "listens" (i.e., continually initiates read operations) for an NFC data signal through its NFC subsystem 8132. In many conditions, being located outside NFC reading range of the covering 950 and any attached passive devices 950, the device 110, 120 executes no associated commands.

At 1415, the device 110, 120 is partially inserted into or otherwise partially covered by covering 10, as for example by a user of the device inserting the device into a holster 10 on his/her belt, etc. Upon coming into reading range of attached NFC device(s) 950, as the covering or insertion process progresses, at 1420 the device 110, 120 may have detected a NFC data signal. The device 110, 120's detection of the NFC data signal may be sustained, intermittent, or otherwise transient. In either case, at step 1420 the device 110, 120 attempts to determine whether a NFC data signal was detected. Depending on the arrangement or configuration of NFC device(s) 950 and NFC antenna(s) 8132*b*, a NFC data signal may be detected as the device 110, 120 is in the process of being covered by covering 10, and then a separate NFC data signal may be detected once the device 110, 120 is fully covered by the covering 10. Alternatively, no NFC data signal may be detected upon partial covering, but a sustained NFC data signal may be detected when the device 110, 120 is fully covered as the NFC device(s) 950 may be located sufficiently close to the position of the NFC antenna 8132*b* when the device 110, 120 is fully covered by covering 10.

If an NFC data signal was detected at 1420, at 1422 the device 110, 120 attempts to determine the device 110, 120 orientation within the covering 10 based at least partly on any data included in the NFC data signal detected at 1420. If the device 110, 120 orientation may be conclusively determined at 1422, then the device may execute a command based on the determined orientation at step 1440. However, due to the various configurations and placements of NFC device(s) 950 and their NFC antenna(s) 8132*b*, and/or other components or (sub)system(s) of the device 110, 120, not all combinations thereof may allow for device orientation to be determined when the device 110, 120 is only partially covered by the covering 10. In particular, while it may be possible to determine whether a front 8320 or rear 8310 face of the device 110, 120 is facing a front 16 or rear 14 surface of covering 10 based only on the NFC data signal detected at 1420, it may not be possible to also determine whether the device 110, 120 is oriented top side up or bottom side up in the covering 10.

At 1425, the device 110, 120 may proceed to be fully inserted into the covering 10 at 1425. Through the act of insertion into covering 10, at 1430 the device 110, 120 may have detected an NFC data signal. If an NFC data signal was detected at 1430, at 1435 the device 110, 120 can attempt to determine the relative orientation of the device 110, 120 within the covering 10 based at least partly on any data included in the NFC data signal detected at 1430, and in the NFC data signal detected at 1420, if available. If the device 110, 120 orientation may be conclusively determined at 1435, then at 1440 the device may execute one or more commands based on the determined orientation.

If for example at 1435, it is only possible to determine whether a front or rear face of the device 110, 120 is facing a front or rear surface of covering 10, then command(s) may be executed at 1440 based only on that orientation determination. If it is also possible to determine whether the device 110, 120 is oriented top side up or bottom side up in the covering 10 at step 1435, then one or more commands executed at 1440 may be based on that orientation determination as well.

If neither type of orientation may be conclusively determined at step 1435, and the device 110, 120 is configured to only execute commands at step 1440 based on a conclusive determination, then control may return to 1410 and the device 110, 120 may continue to listen for NFC data signals. If no NFC data signal is detected at 1430 after the device 110, 120 becomes fully covered by the covering 10, then the device 110, 120 may continue to listen for NFC data signals at step 1410. The act of removing or uncovering device 110, 120 from covering 10 may also cause the device 110, 120 to execute a corresponding command, if the device 110, 120 is so configured.

Various alternative implementations/embodiments of device(s) 110, 120, covering(s) 10, and process(es) 1400 will now be described with reference to FIGS. 5 to 11. Such implementations are exemplary and are not intended to limit the scope of the invention. A person skilled in the art will appreciate that other arrangements and interactions of NFC devices 950 and NFC subsystem 8132 may be possible to also determine the orientation of the device 110, 120 within the covering 10.

Turning to the exemplary non-limiting implementation of FIG. 5, a side, partial cutaway view of a device 110, 120 is shown, with the device 110, 120 inserted into covering 10. Covering 10 may for example comprise whole or partial rear side 16 connected to whole or partial front side 14 by a bottom end 18. Side wall(s) connecting the bottom end 18, rear side 16, and front side 14 may (or may not) be wholly or partially present, but are not shown in FIG. 5. The device 110, 120 may be inserted into and removed from the covering 10 through generally open top end 20. In the embodiment shown, there are two NFC devices 950 attached to the covering 10. Respective NFC devices 950 are attached to the front side 14 proximate the bottom end 18, and to the rear side 16 proximate the bottom end 18. The NFC device 950 may store data indicating the approximate position of the NFC device 950 with respect to the covering 10. NFC antenna 8132b of NFC subsystem 8132 is proximate rear side 8310 of the housing 8120 and extends substantially along the rear side 8310. Shielding 8330 may be present in device 110, 120 separating the antenna 8132b from the front side 8320 of the device 110, 120. Although NFC subsystem 8132 is shown proximate a bottom end of the device 110, 120, NFC subsystem 8132 may be disposed anywhere in the housing 8120.

In some embodiments, the placement, shape, and/or routing of the antenna 8132b that important for determining the orientation of the device 110, 120. Such factors can, for example, be used advantageously in view of the relatively short practical communication range(s) of many NFC devices. In order for communications to be established or maintained between NFC subsystem 8132 and NFC device 950, a respective NFC antenna 8132b it may be advantageous, and in some embodiments necessary, that the antenna 8132b be placed so that when the device 110, 120 is fully inserted into the covering 10 the antenna 8132b is relatively nearby to the respective NFC device 950. Antenna 8132b may extend over all or substantially all of rear side 8310, a half or some other portion of the rear side 8310, or somewhere between half and a substantial length of the rear side 8310, optionally starting from or reaching an end of the housing 8120. The antenna 8132b may be coiled, bent, or otherwise shaped in particular way(s), in order to facilitate various types of NFC communication(s). For example, the antenna 8132b may extend in a relatively straight line, or traverse a larger surface area of rear side 8310 by being shaped in a wide variety of ways. In such implementations, when the device 110, 120 is placed in the covering 10, the antenna 8132b may detect a signal from the NFC device 950 that is facing the rear side 8310 of the housing 8120.

The following pseudocode-like statements describe method steps, which will be readily understandable and programmable by those skilled in the relevant arts, once they have been made familiar with this disclosure. Processes such as those shown may, for example, by employed by a device 110, 120, and in particular any processors 8180, etc., or other controllers of an NFC subsystem(s) 8132 and associated memory(ies) 8116 to determine the orientation of the device 110, 120 in the embodiment shown in FIG. 5. In the listing, each preceding reference number indicates a line number for the text that follows. Although in this example the antenna 8132b is described as being located proximate the rear side 8310 of the device 110, 120, the antenna 8132b may alternatively be positioned proximate the front side 8320. The orientation determination logic would change accordingly.

Line 500010: listen for NFC data signal
500020: if NFC signal is detected then
500100: if it is a front cover NFC tag then
500110: device 110, 120 is facing rearwards in covering 10
500120: execute corresponding command
500130: listen for another NFC data signal
500140: if no signal is detected then
500150: device 110, 120 is removed from covering
500160: execute corresponding command
500170: goto Line 500010
500200: if it is a rear cover NFC tag then
500210: device 110, 120 is facing frontwards in covering 10
500220: execute corresponding command
500230: listen for another NFC data signal
500240: if no signal is detected then
500250: device 110, 120 is removed from covering
500260: execute corresponding command
500270: goto Line 500010

At the method step identified at line 500010, NFC subsystem 8132 listens for a NFC data signal through its antenna 8132b. When a signal is detected at line 500020, a data transfer occurs between the NFC subsystem 8132 and the NFC device 950. The data from the detected NFC device 950 is read by the NFC subsystem 8132 through the antenna 8132b. The data comprises information whether the NFC device 950 is attached to the front side 14 or rear side 16 of the covering 10. At lines 500110 to 500130 and corresponding lines 500210 to 500230, the device 110, 120 executes a command corresponding to the orientation of the device 110, 120 within the housing as determined from the data read from the NFC device 950. At lines 500140 to 500170 and corresponding lines 500240 to 500270, the device 110, 120 listens for another NFC data signal. As the antenna 8132b is still at least momentarily in proximity with NFC device 950, the same NFC data signal initially detected will continue to be detected, at least for a short time. As there are no other NFC devices 950 on the same side of the covering 10 as the initially detected NFC device 950, then as soon as the device 110, 120 is removed or partially removed from the covering 10 such that antenna 8132b is no longer in proximity to NFC device 950 to maintain communications therewith, the device 110, 120 determines that the device 110, 120 is removed from the covering 10. A corresponding command may be executed and the operational state returns to line 500010, that is listening for a NFC data signal while being not within the covering 10. While the front/rear orientation of the device 110, 120 within the covering 10 may be determined by this implementation, it may not be possible to determine the up/down orientation of the device 110, 120 within the covering 10 in this implementation, without the use of further devices or systems.

Figure 6:
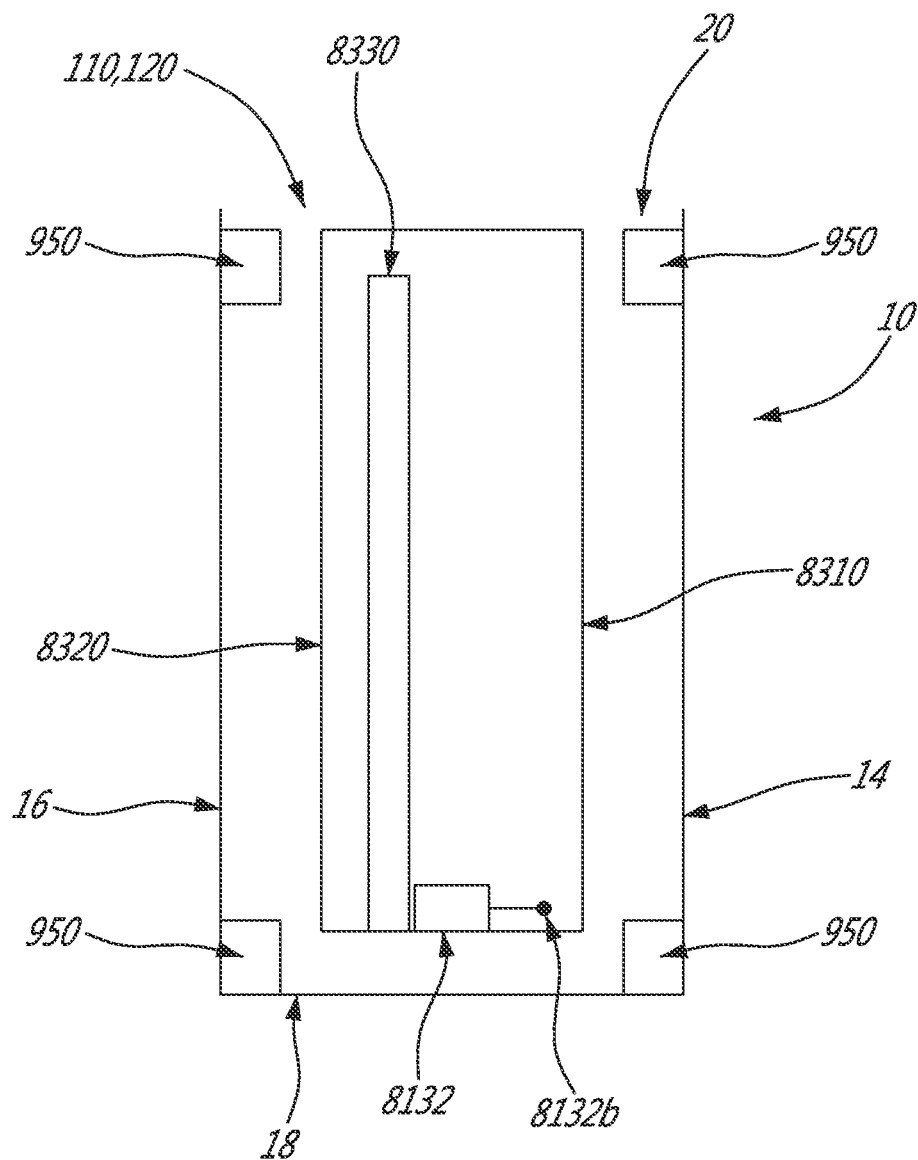

Turning to the exemplary non-limiting implementation of FIG. 6, a side view of device 110, 120 is once again shown, with the device 110, 120 inserted into covering 10. In this implementation there are four NFC devices 950 attached to the covering 10. NFC devices 950 are respectively attached to the front side 14 proximate the bottom end 18, to the rear side 16 proximate the bottom end 18, to the front side 14 proximate the top end 20, and to the rear side 16 proximate the top end 20. NFC antenna 8132b of NFC subsystem 8132 is proximate rear side 8310 of the housing 8120 and terminates at a location proximate a bottom end of the device 110, 120. Shielding 8330 may be present in device 110, 120 separating the antenna 8132b from the front side 8320 of the device 110, 120 and may further optionally shield the antenna 8132b from the top of the device 110, 120. As antenna 8132b terminates near the bottom of the housing 8120 proximate the rear side 8310 of housing 8120, this general location of the housing 8120 must be moved relatively near to a respective NFC device 950 to establish a NFC communication therewith. In order to maintain such a communication for a prolonged period of time, it may be important that the housing 8120 remain in that approximate position. In the embodiment shown, the antenna 8132b does not extend along a significant length of the rear side 8310.

The following pseudocode-like statements describe a process suitable for use in determine the orientation of a device 110, 120 in an embodiment in accordance with FIG. 6. Although the antenna 8132b is described as being located proximate the rear side 8310 of the device 110, 120, near the bottom of the device 110, 120, the antenna 8132b may alternatively be positioned at any other approximate "corner" of the device 110, 120. The orientation determination logic would change accordingly.

600010: listen for NFC data signal
    600020: if NFC signal is detected then
    600100: listen for another NFC data signal
    600105: if same signal is continuously detected for a set time interval then
    600107: device oriented bottom side up
    600110: if it is a front cover NFC tag then
    600115: device 110, 120 is facing rearwards in covering 10
    600120: execute corresponding command based on device orientation
    600125: listen for another NFC data signal
    600210: else if it is a rear cover NFC tag then
    600215: device 110, 120 is facing frontwards in covering 10
    600220: execute corresponding command based on device orientation
    600225: listen for another NFC data signal
    600310: if no signal is detected for a set time interval then
    600315: device 110, 120 is removed from covering
    600320: execute corresponding command
    600325: goto Line 600010
    600400: if different signal is detected then
    600410: device oriented top side up
    600420: goto Line 600110

At line 600010, NFC subsystem 8132 listens for a NFC data signal through its antenna 8132b. When a signal is detected at line 600020, a data transfer occurs between the NFC subsystem 8132 and the NFC device 950. The data from the detected NFC device 950 is read by the NFC subsystem 8132 through the antenna 8132b. The data comprises information whether the NFC device 950 is attached to the front side 14 or rear side 16 of the covering 10. The data may also comprise information whether the NFC device 950 is attached to the covering 10 near the top 20 or bottom 18 of the covering 10. At line 600100, the NFC subsystem 8132 listens for another NFC data signal. At 600105, if the same signal is continuously detected for a set time interval (such as 1 second, 2 seconds, 5 seconds, or any other time interval), then at 600107 it is determined that the device is oriented bottom side up as the short antenna 8132b is continuously located near the NFC device 950. This would occur when the device 110, 120 is fully or substantially fully inserted into the covering 10 so that the device 110, 120 is covered by the covering 10. If the device rests in this position for a time, then the device 110, 120 may conclude that it is inserted bottom side up. At lines 600110 to 600125 and corresponding lines 600210 to 600225, the device 110, 120 executes a command corresponding to the orientation of the device 110, 120 within the housing as determined from the data read from the NFC device 950. If the same signal was not continuously detected, at lines 600310 to 600325, the device 110, 120 listens for another NFC data signal. If such another NFC data signal is detected, the device 110, 120 may determine that it is inserted within the covering 10 top side up. The device 110, 120 then goes to 600110 to execute the command corresponding to the orientation of the device. If no signal is detected for a set time interval, then it is determined that the device 110, 120 is removed from the covering 10. A corresponding command may be executed and the operational state returns to line 600010, that is listening for a NFC data signal while being not within the covering 10.

Turning to the exemplary non-limiting implementation of FIG. 7, a side view of device 110, 120 is once again shown, with the device 110, 120 inserted into covering 10. In this implementation there is one NFC device 950 attached to the covering 10 at the front side 14 proximate the bottom end 18. In this implementation, NFC subsystem 8132 comprises two NFC antennas 8132b, one proximate rear side 8310 of the housing 8120, and the other proximate a front side 8320 of the housing 8120. Shielding 8330 may be present in device 110, 120 separating the antennas 8132b from one another. In this implementation, when the device 110, 120 is placed in the covering 10, the antenna 8132b facing the front side 14 of the covering 10 may detect a signal from the NFC device 950.

The following pseudocode-like statements describe method steps suitable for use in conjunction with a configuration such as that shown in FIG. 7.

700010: listen for NFC data signal
    700020: if NFC signal is detected then
    700100: if the rear facing antenna detected the tag then
    700110: device 110, 120 is facing rearwards in covering 10
    700120: execute corresponding command
    700130: listen for another NFC data signal
    700140: if no signal is detected then
    700150: device 110, 120 is removed from covering
    700160: execute corresponding command
    700170: goto Line 700010
    700200: if the front facing antenna detected the tag then
    700210: device 110, 120 is facing frontwards in covering 10
    700220: execute corresponding command
    700230: listen for another NFC data signal
    700240: if no signal is detected then 700250: device 110, 120 is removed from covering
700260: execute corresponding command
700270: goto Line 700010

At line 700010, NFC subsystem 8132 listens for a NFC data signal through its antennas 8132*b*. When a signal is detected at line 700020, a data transfer occurs between the NFC subsystem 8132 and the NFC device 950. The data from the detected NFC device 950 is read by the NFC subsystem 8132 through the respective antenna 8132*b*. The data comprises information whether the NFC device 950 is attached to the front side 14 or rear side 16 of the covering 10. At lines 700110 to 700130 and corresponding lines 700210 to 700230, the device 110, 120 executes a command corresponding to the orientation of the device 110, 120 within the housing as determined from the data read from the NFC device 950. At lines 700140 to 700170 and corresponding lines 700240 to 700270, the device 110, 120 listens for another NFC data signal. As the antenna 8132*b* is still at least momentarily in proximity with NFC device 950, the same NFC data signal initially detected will continue to be detected, at least for a short time. As there are no other NFC devices 950 on the same side of the covering 10 as the initially detected NFC device 950, then as soon as the device 110, 120 is removed or partially removed from the covering 10 such that antennas 8132*b* are no longer in proximity to NFC device 950 to maintain communications therewith, the device 110, 120 determines that the device 110, 120 is removed from the covering 10. A corresponding command may be executed and the operational state returns to line 700010, that is listening for a NFC data signal while being not within the covering 10. While the front/rear orientation of the device 110, 120 within the covering 10 may be determined by this implementation depending on which antenna 8132*b* is in proximity to and communicates with NFC device 950, it may not be possible to determine the up/down orientation of the device 110, 120 within the covering 10 in this implementation, without the use of further devices or systems.

Turning to the exemplary non-limiting implementation of FIG. 8, a side view of device 110, 120 is once again shown, with the device 110, 120 inserted into covering 10. In this implementation there are two NFC devices 950 attached to the covering 10 in generally diagonally-opposite locations. NFC devices 950 are respectively attached to the front side 14 proximate the bottom end 18, and to the rear side 16 proximate the top end 20. The NFC subsystem 8132 may comprise two NFC antennas 8132*b*, one proximate rear side 8310 of the housing 8120 and terminating at a location proximate a bottom end of the device 110, 120, the other antenna 8132*b* proximate front side 8320 terminating at a location proximate a bottom end of the device 110. Shielding 8330 may be present in device 110, 120 separating the antennas 8132*b* from one another. Optionally, shielding 8330 may also separate the antennas 8132*b* from the top of the device 110, 120. In this implementation, as each antenna 8132*b* terminates near the bottom of the housing 8120 proximate side 8310, or 8320 of housing 8120, one NFC device 950 will be detected by one of the antennas 8132*b* upon beginning to cover the device 110, 120 by the covering 10, and the other NFC device 950 will be detected by the other respective antenna 8132*b* when the device 110, 120 is substantially fully covered by the covering 10.

The following pseudocode-like statements describe method steps suitable for use in conjunction with a configuration such as that shown in FIG. 8. Although each antenna 8132*b* is described as being located proximate a bottom of the device 110, 120, each antenna 8132*b* may alternatively be positioned proximate a top of the device 110, 120. The orientation determination logic would change accordingly.

800010: listen for NFC data signal
800020: if NFC signal is detected then
800100: listen for another NFC data signal
800105: if same signal is continuously detected for a set time interval by one antenna then
800110: if antenna is rear antenna 8132*b* then
800115: device is oriented bottom side up and is front facing
800120: execute corresponding command
800125: listen for another NFC data signal
800130: if antenna is front antenna 8132*b* then
800135: device is oriented bottom side up and is rear facing
800140: execute corresponding command
800145: listen for another NFC data signal
800150: else if the second antenna detects a signal within a set time then
800155: if the second antenna is rear antenna 8132*b* then
800160: device is oriented top side up and is rear facing
800165: execute corresponding command
800170: listen for another NFC data signal
800175: if the second antenna is front antenna 8132*b* then
800180: device is oriented top side up and is front facing
800185: execute corresponding command
800190: listen for another NFC data signal
800195: if no signal is detected for a set time interval then
800200: device 110, 120 is removed from covering
800205: execute corresponding command
800210: goto Line 800010

At line 800010, NFC subsystem 8132 listens for a NFC data signal through its antennas 8132*b*. When a signal is detected at line 800020, a data transfer occurs between the NFC subsystem 8132 and the NFC device 950. The NFC subsystem 8132 then continues to listen for NFC signals at 800100. At 800105, if the same signal is continuously detected for a set time interval by the same antenna 8132*b*, then at 800110 or 800130, respectively depending on the antenna 8132*b* that detected the signal, the device orientation is determined. If the rear antenna 8132*b* performed the detection then the device is oriented bottom side up and front facing. If the front antenna 8132*b* performed the detection then the device is oriented bottom side up and is rear facing. Otherwise, if a second antenna detects a NFC signal within a set time at 800150, then at 800155 or 800175, respectively depending on the antenna 8132*b* that detected the second NFC signal, the device orientation is determined. If the rear antenna performed the second detection, then the device oriented top side up and rear facing. If the front antenna 8132*b* performed the detection then the device is oriented top side up and front facing. A corresponding command may be executed at each of 800120, 800140, 800165, and 800185 depending on the orientation detected. If no signal is detected for a set time interval, then it is determined that the device 110, 120 is removed from the covering 10. A corresponding command may be executed and the operational state returns to line 800010, that is listening for a NFC data signal while being not within the covering 10.

Figure 9:
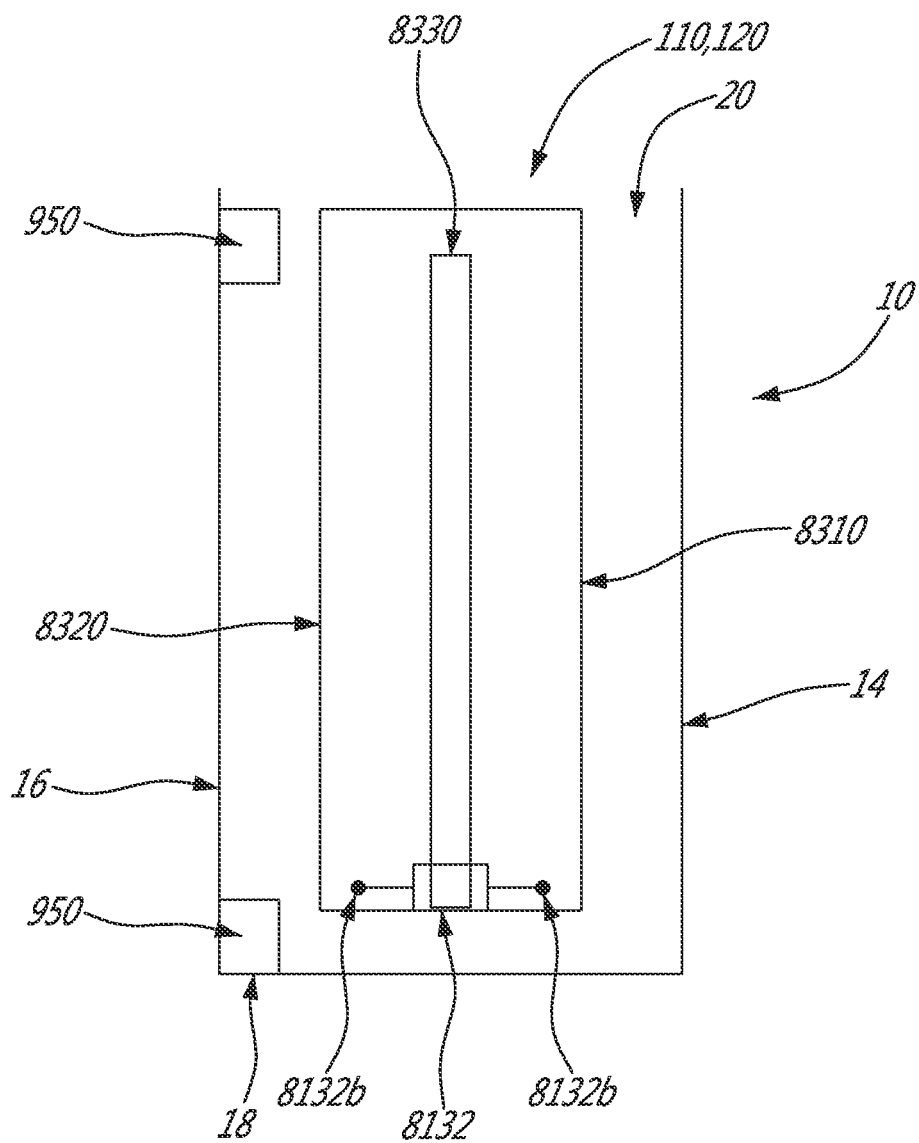

Turning to the exemplary non-limiting implementation of FIG. 9, a side view of device 110, 120 is once again shown, with the device 110, 120 inserted into covering 10. In this implementation there are two NFC devices 950 attached to the covering 10 at rear side 16 in general proximity to bottom end 18 and top end 20, respectively. The NFC subsystem 8132 may comprise two NFC antennas 8132*b*, one proximate rear side 8310 of the housing 8120 and terminating at a location proximate a bottom end of the device 110, 120, the other antenna 8132b proximate front side 8320 terminating at a location proximate a bottom end of the device 110. Shielding 8330 may be present in device 110, 120 separating the antennas 8132b from one another. Optionally, shielding 8330 may also separate the antennas 8132b from the top of the device 110, 120. Optionally, shielding may also be present in the covering 10 separating the NFC devices 950 from one another.

In the embodiment shown, as each antenna 8132b terminates near the bottom of the housing 8120 proximate a side 8310, 8320 of housing 8120, one NFC device 950 will be detected by one of the antennas 8132b upon beginning to cover the device 110, 120 by the covering 10 starting from the bottom of the housing 8120, and the other NFC device 950 will be detected by the same respective antenna 8132b when the device 110, 120 is substantially fully covered by the covering 10. Accordingly, only one antenna 8132b detects a signal from the NFC devices 950 in each particular orientation of the device 110, 120 when covered by the covering 10 in this implementation. When starting to cover the housing 8120 from the top of the housing 8120, such that the device 110, 120 is covered upside-down, neither antenna 8132b will detect a NFC signal until the device is substantially fully covered by the covering 10. Accordingly, once one of the antennas 8132b detects a sustained NFC signal, the device 110, 120 may determine that the device 110, 120 is fully covered by the covering 10.

By (i) exploiting the short-range communication distance of the NFC devices 950; (ii) knowing either that one NFC device 950 will be briefly read followed by another one, or one NFC device 950 will be read for a sustained period; and (iii) due to the known positioning of the antennas 8132b, it is possible in such embodiments to determine whether device 110, 120 is fully inserted and particularly oriented based on the successive or sustained reads of the NFC device(s) 950. Accordingly, any implementation using combinations of tags and antennas that allow device 110, 120 to detect any of the following events may allow for the device 110, 120 to determine its orientation: (i) if two NFC devices 950 are read in closely timed succession, but one of the NFC devices 950 is not constantly being read; (ii) if two NFC devices 950 are read simultaneously, either by the same antenna 8132b or by different antennas 8132b; and (iii) if one or more NFC device(s) 950 are always being read, for sustained periods, once covering the device 110, 120 by the covering 10.

As an NFC device 950 of covering 10 may be readable by device 110, 120 when device 110, 120 is in close proximity to the covering 10, outside of and not covered by the covering 10, the device 110, 120 is preferably also able to determine when communicating with NFC devices 950 while not covered. This may be possible where the device 110, 120 is configured to measure the time delay between reading successive NFC devices 950, or by measuring the length of time of a sustained reading of one NFC device 950. In this way the device 110, 120 may be configured to compensate for situations where the device 110, 120 either accidentally reads one of the NFC devices 950 from outside the covering 10 or where the device 110, 120 is not yet fully inserted into the covering 10.

The following pseudocode-like statements describe method steps suitable for use in conjunction with a configuration such as that shown in FIG. 9. Although each antenna 8132b is described as being located proximate a bottom of the device 110, 120, each antenna 8132b may alternatively be positioned proximate a top of the device 110, 120. The orientation determination logic would change accordingly.

900010: listen for NFC data signal
900020: if NFC signal is detected then
900100: listen for another NFC data signal
900105: if same signal is continuously detected for a set time interval by one antenna then
900110: if antenna is rear antenna 8132b then
900115: device is oriented bottom side up and is front facing
900120: execute corresponding command
900125: listen for another NFC data signal
900130: if antenna is front antenna 8132b then
900135: device is oriented bottom side up and is rear facing
900140: execute corresponding command
900145: listen for another NFC data signal
900150: else if the same antenna detects a second signal within a set time then
900155: if antenna is rear antenna 8132b then
900160: device is oriented top side up and is front facing
900165: execute corresponding command
900170: listen for another NFC data signal
900175: if the second antenna is front antenna 8132b then
900180: device is oriented top side up and is rear facing
900185: execute corresponding command
900190: listen for another NFC data signal
900195: if no signal is detected for a set time interval then
900200: device 110, 120 is removed from covering
900205: execute corresponding command
900210: goto Line 900010

At line 900010, NFC subsystem 8132 listens for a NFC data signal through its antennas 8132b. When a signal is detected at line 900020, a data transfer occurs between the NFC subsystem 8132 and the NFC device 950. The NFC subsystem 8132 then continues to listen for NFC signals at 900100. At 900105, if the same signal is continuously detected for a set time interval by the same antenna 8132b, then at 900110 or 900130, respectively depending on the antenna 8132b that detected the signal, the device orientation is determined. If the rear antenna 8132b performed the detection then the device is oriented bottom side up and front facing. If the front antenna 8132b performed the detection then the device is oriented bottom side up and is rear facing. Otherwise, if a second NFC signal is detected by the same antenna within a set time at 900150, then at 900155 or 900175, respectively depending on the antenna 8132b that detected the second NFC signal, the device orientation is determined. If the rear antenna 8132b performed the second detection, then the device oriented top side up and front facing. If the front antenna 8132b performed the detection then the device is oriented top side up and rear facing. A corresponding command may be executed at each of 900120, 900140, 900165, and 900185 depending on the orientation detected. If no signal is detected for a set time interval, then it is determined that the device 110, 120 is removed from the covering 10. A corresponding command may be executed and the operational state returns to line 900010, that is listening for a NFC data signal while being not within the covering 10.

In embodiments such as that shown in FIG. 9, instead of determining the up/down orientation of the device 110, 120 based on a succession of reads of the NFC devices 950, the orientation of the device 110, 120 may be determined based only on the data read from the NFC device 950 once the device 110, 120 is fully covered by the covering 10. For example, the NFC device 950 proximate the top 20 of the covering 10 may contain data indicating that it is near the top of the covering 10. The NFC device 950 proximate the bottom 18 of the covering 10 may contain data indicating that it is near the bottom of the covering 10. Once the device 110, 120 is fully covered by the covering 10, one of the antennas 8132b may detect a sustained NFC data signal from one of the NFC devices 950 located near that antenna 8132b. By knowing where the antennas 8132b are placed in the device 110, 120 and based on the data read from the respective NFC device 950, the device 110, 120 may determine its up/down orientation in the covering 10, in addition to its front/rear orientation.

Optionally, a first read of a NFC device 950 by the NFC subsystem 8132 may cause the device 110, 120 to disable a touch input mechanism of the device 110, 120 in order to reduce false touches while the device 110, 120 is in the process of being covered by the covering 10.

The implementation shown in FIG. 9 may be modified to use four NFC devices 950 placed at respective corners of the covering 10 and one antenna 8132b at a corner location of the device 110, 120. Another modification may be possible using one NFC device 950 at a selected one of the corners of the covering 10, and four antennas 8132b at respective corner locations of the device 110, 120.

Figure 10:
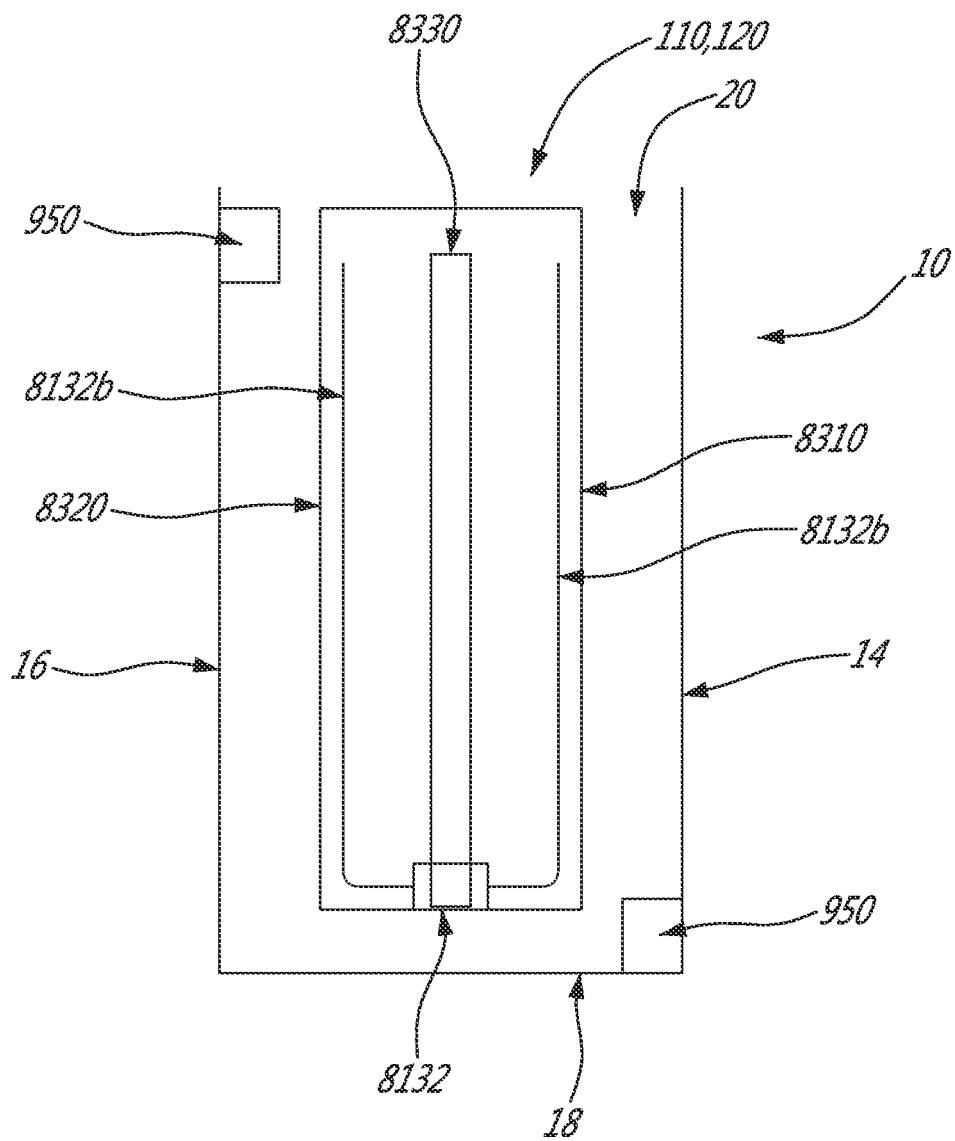

Turning to the exemplary non-limiting implementation of FIG. 10, a side view of device 110, 120 is once again shown, with the device 110, 120 inserted into covering 10. In this implementation there is one NFC device 950 attached to the covering 10 at the front side 14 proximate the bottom end 18, and one NFC device 950 attached to the covering 10 at the rear side 16 proximate the top end 20. NFC subsystem 8132 comprises two NFC antennas 8132b, one proximate rear side 8310 of the housing 8120, and the other proximate a front side 8320 of the housing 8120. Shielding 8330 may be present in device 110, 120 separating the antennas 8132b from one another. Each antenna 8132b may extend the entirety of side 8310, 8320, a substantial length of side 8310, 8320, a half of the side 8310, 8320, or somewhere between half and a substantial length of the side 8310, 8320, optionally starting from or reaching an end of the housing 8120. In this implementation, when the device 110, 120 is first inserted into the covering 10, the respective antenna 8132b facing the rear side 16 of the covering 10 may initially detect a signal from the NFC device 950 attached to the rear side 16 of the covering near the top end 20.

As it may not always be practical for a particular device 110, 120 configuration to employ shorter antennas 8132b due to other design constraints of the device 110, 120, the configuration of antennas 8132b is used in this implementation to primarily determine the front/rear facing orientation of the device 110, 120 in the covering 10. However, in this implementation, it may not be possible to determine the up/down orientation of the device 110, 120 within the covering 10 without the use of further devices or systems (such as described in previous implementations), as the antennas 8132b each substantially extend along an entirety of side 8310 or 8320. Accordingly, as soon as the device 110, 120 is inserted into the covering 10, at least one of the antennas 8132b will detect and continue to detect one of the NFC devices 950 until the device 110, 120 is removed from the covering 10. Once the second NFC device 950 is detected, then the device 110, 120 can determine that it the device 110, 120 is fully covered by the covering 10.

The following pseudocode-like statements describe method steps suitable for use in conjunction with a configuration such as that shown in FIG. 10.

1000010: listen for NFC data signal
1000020: if NFC signal is detected then
1000100: if the rear facing antenna detected the tag then
1000105: listen for another NFC data signal
1000110: if front facing antenna detected another tag while rear facing antenna continued to detect its tag then
1000115 device 110, 120 is front facing in covering 10
1000120: execute corresponding command
1000125: listen for another NFC data signal
1000130: if rear facing antenna stops detecting its tag then
1000135: device 110, 120 is removed from covering
1000160: execute corresponding command
1000170: goto Line 1000010
1000200: if the front facing antenna detected the tag then
1000205: listen for another NFC data signal
1000210: if rear facing antenna detected another tag while front facing antenna continued to detect its tag then
1000215 device 110, 120 is rear facing in covering 10
1000220: execute corresponding command
1000225: listen for another NFC data signal
1000230: if front facing antenna stops detecting its tag then
1000235: device 110, 120 is removed from covering
1000260: execute corresponding command
1000270: goto Line 1000010

At line 1000010, NFC subsystem 8132 listens for a NFC data signal through its antennas 8132b. When a signal is detected at line 1000020, a data transfer occurs between the NFC subsystem 8132 and the NFC device 950. The data from the detected NFC device 950 is read by the NFC subsystem 8132 through the respective antenna 8132b. The data comprises information whether the NFC device 950 is attached to the front side 14 or rear side 16 of the covering 10. At line 1000105 and corresponding line 1000205, depending on the antenna 8132b that detected the initial NFC data signal, the device 110, 120 listens for another NFC data signal. At lines 1000110 and 1000210, respectively, if the other antenna that did not detect the first NFC data signal detects a second NFC data signal, then a command may be executed by the device 110, 120 corresponding to the orientation of the device 110, 120 within the housing as determined from the data read from the NFC device 950. At lines 1000130 to 1000170 and corresponding lines 1000230 to 1000270, the device 110, 120 listens for another NFC data signal. Once the antenna 8132b that detected the first NFC signal at 1000020 no longer detects an NFC data signal, the device 110, 120 determines that the device 110, 120 is removed from the covering 10. A corresponding command may be executed and the operational state returns to line 1000010, that is listening for a NFC data signal while being not within the covering 10.

Figure 11:
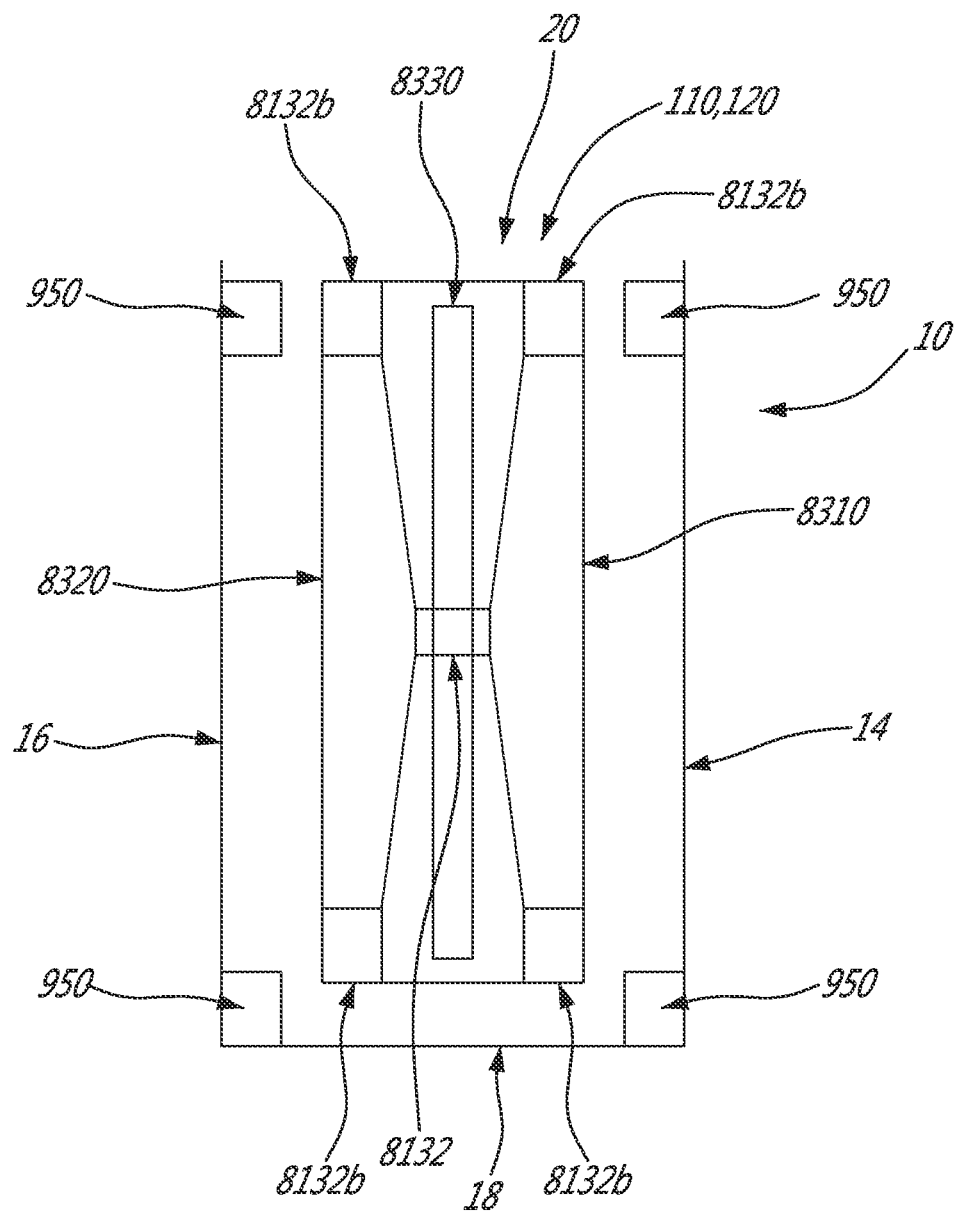

Turning to the exemplary non-limiting implementation of FIG. 11, a side view of a device 110, 120 is once again shown, with the device 110, 120 inserted into covering 10. In this implementation there are four NFC devices 950 attached to the covering 10. NFC devices 950 are respectively attached to the front side 14 proximate the bottom end 18, to the rear side 16 proximate the bottom end 18, to the front side 14 proximate the top end 20, and to the rear side 16 proximate the top end 20. In this implementation, there are also four NFC antennas 8132b of NFC subsystem 8132, each proximate a respective corner of the housing 8120 as shown. Shielding 8330 may be present in device 110, 120 separating each antenna 8132b from the opposing side 8310, 8320 of the device 110, 120. Optionally, shielding 8330 may also separate each antenna 8132b from opposite top or bottom end of the device 110, 120.

In embodiments such as that shown, as each antenna 8132*b* terminates near the bottom or top of the housing 8120 proximate the rear side 8310 or front side 8320 of housing 8120, it is advantageous for the housing 8120 to be moved such that the general location of the respective antenna 8132*b* is relatively near to a respective NFC device 950 to establish a NFC communication therewith. In order to maintain such a communication, it is generally preferable that the housing 8120 remain in that approximate relative location.

The following pseudocode-like statements describe method steps suitable for use in conjunction with a configuration such as that shown in FIG. 11.

1100010: listen for NFC data signal

1100020: if NFC signal is detected by an antenna near the bottom of the device 110, 120 then

1100100: listen for another NFC data signal

1100110: if any antenna 8132*b* near the bottom of the device 110, 120 detected another tag, while any antenna 8132*b* near the top of the device 110, 120 also detected a tag then

1100120 device is oriented top up, and facing orientation is determined based on data read from NFC devices 950

1100130: execute corresponding command based on device orientation

1100140: listen for another NFC data signal

1100150: if no NFC signal detected for a set time interval then

1100160: device is removed from covering 10

1100170: execute corresponding command based on device orientation

1100180: goto Line 1100010

1100190: if NFC signal is detected by an antenna near the top of the device 110, 120 then

1100200: listen for another NFC data signal

1100210: if any antenna 8132*b* near the top of the device 110, 120 detected another tag, while any antenna 8132*b* near the bottom of the device 110, 120 also detected a tag then

1100220 device is oriented bottom up, and facing orientation is determined based on data read from NFC devices 950

1100230: execute corresponding command based on device orientation

1100240: listen for another NFC data signal

1100250: if no NFC signal detected for a set time interval then

1100260: device is removed from covering 10

1100270: execute corresponding command based on device orientation

1100280: goto Line 1100010

At line 1100010, NFC subsystem 8132 listens for a NFC data signal through its antennas 8132*b*. When a signal is detected at line 1100020 or 1100190 by either antenna 8132*b* located at a bottom end or top end, respectively, of the device 110, 120, a data transfer occurs between the NFC subsystem 8132 and the NFC device 950. The data from the detected NFC device 950 is read by the NFC subsystem 8132 through the respective antenna 8132*b* near to the NFC device 950. The data may comprise information whether the NFC device 950 is attached to the front side 14 or rear side 16 of the covering 10. The data may also comprise information whether the NFC device 950 is attached to the covering 10 near the top 20 or bottom 18 of the covering 10. As NFC devices 950 are located in each corner of the covering 10, likely as soon as one antenna 8132*b* detects a NFC device 950, another antenna 8132*b* will also detect a NFC device 950 and read data from that NFC device 950 as well. At line 1100100 or corresponding line 1100200, the NFC subsystem 8132 listens for another NFC data signal. At 1100110 or 1100210, if a same antenna 8132*b* that detected a signal at 110020 or 1100190 detects another signal, and an antenna 8132*b* at an opposite end of the device 110, 120 also detects a signal, then the device 110, 120 is within the covering 10. At line 1100120 or 1100220, the device orientation is determined based on the sequence of detections by the respective antennas 8132*b* or by data read from the NFC devices 950. At line 1100130 or 1100230 a command may be executed corresponding to the determined device 110, 120 orientation within the covering 10, and the NFC subsystem 8132 resumes listening for another NFC data signal at 1100140 or 1100240. If no signal is detected for a set time interval, then it is determined that the device 110, 120 is removed from the covering 10. A corresponding command may be executed and the operational state returns to line 1100010, that is listening for a NFC data signal while being not within the covering 10. The data stored in each NFC device 950 may be the same, or unique. For example, two of the NFC devices 950 at diagonally opposite corners of the covering 10 may include data identifying the location of the respective NFC device 950, while the remaining two NFC devices 950 may contain no particular identifying data beyond simply indicating that an NFC device 950 is present. This may be sufficient for the device 110, 120 to determine both its front/rear facing orientation and up/down orientation in this implementation.

In any of the implementations described, the device 110, 120 may include more than one NFC subsystem 8132, each acting independently of one another. Each antenna 8132*b* may be connected to any or all of the respective NFC subsystems 8132.

In any of the exemplary implementations described, in order to increase the accuracy of orientation determination (s) in some circumstances, a unique covering 10 identifier may be included in the data stored in each NFC device 950. The device 110, 120 may be configured to execute particular commands based on the covering identifier. For example, a covering identifier that indicates to the device 110, 120 that the covering 10 has a particular shape or configuration may cause the device 110, 120 to execute commands based on that known shape or configuration.

While particular configurations of NFC device(s) 950 and NFC antennas 8132*b* may allow a device 110, 120 to determine its orientation within a covering 10, the device 110, 120 may require, or advantageously make use of, additional information in order to determine the orientation of the covering 10 itself. Thus, for example, an NFC device 950 may include data that instructs the device 110, 120 as to which portion of the covering 10 the device 950 is attached to, as for example the top 20 or bottom 18 edge of the covering 10, and/or the front 14 or rear 16 side of the covering 10. to which the respective NFC device 950 is attached.

Although in the exemplary implementations described, sides 14, 16, and end 18 of covering 10 are shown as being substantially continuous, each side 14, 16, and end 18, 20 may be shorter than the corresponding side or end of the device 110, 120. Each side 14, 16, and end 18, 20 may be a solid surface, mesh, elastic material, resilient material, metal, leather, or any other fabric or material. As coverings 10 come in various shapes, sizes, and materials, it should be understood that the present invention is not to be limited to any particular type, size, or configuration of covering 10.

Figure 13:
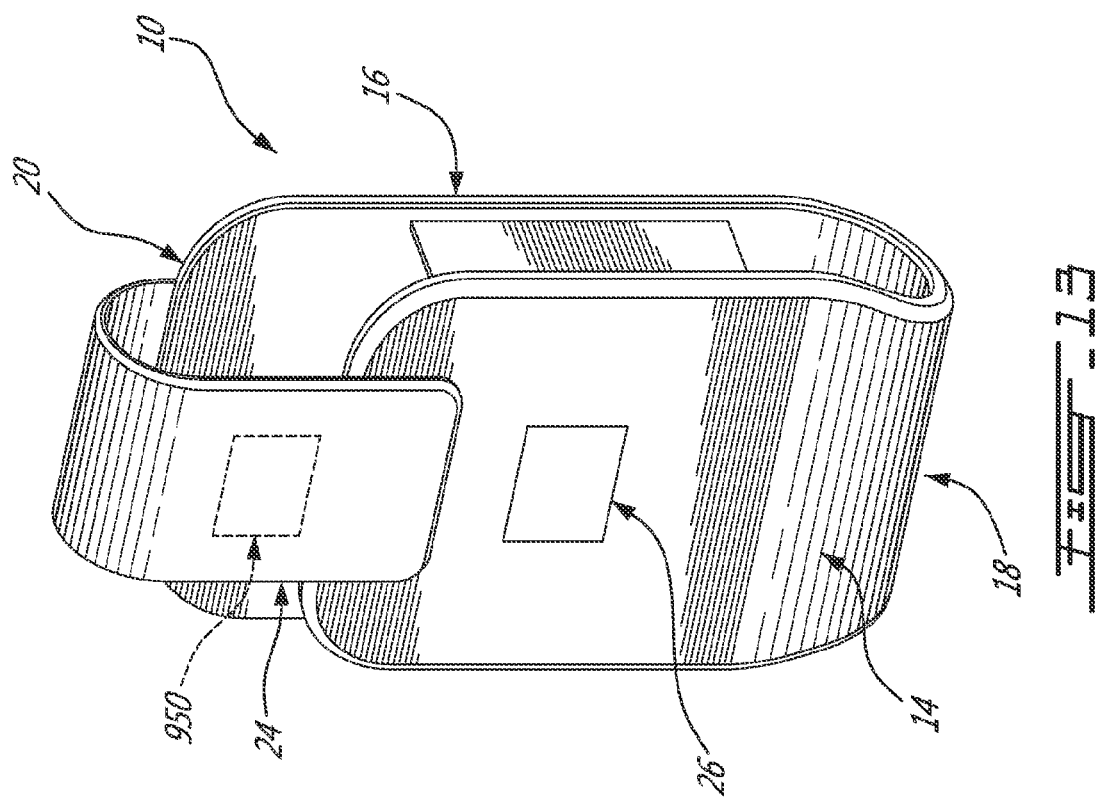
Figure 12:
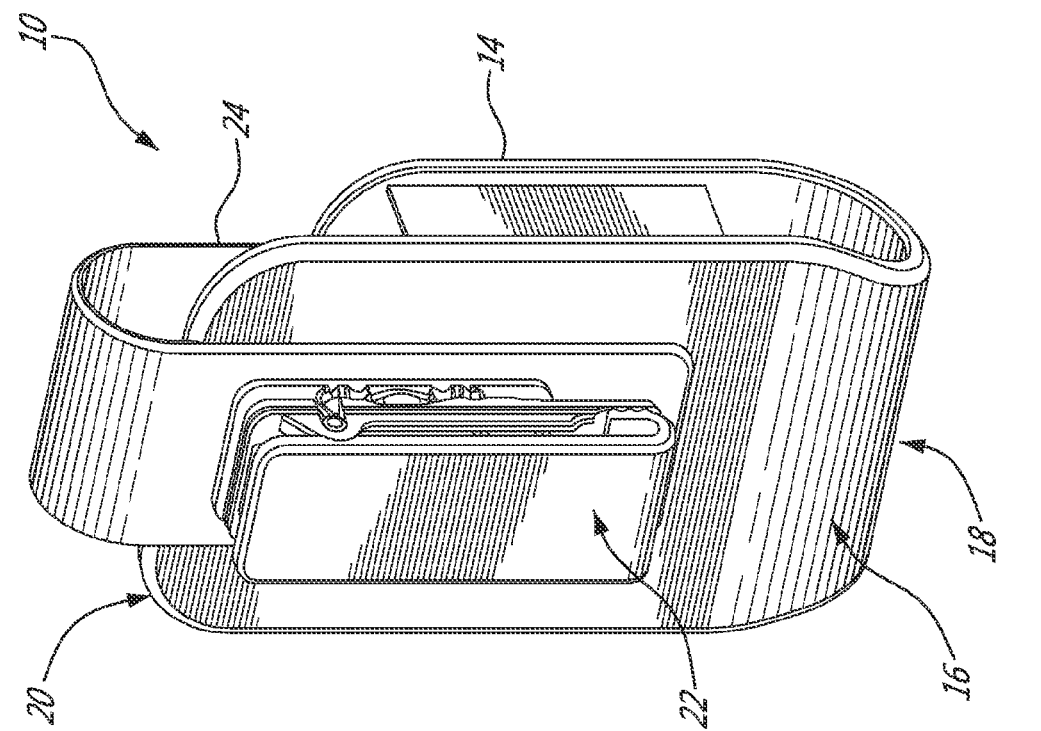

Covering 10 may have a moveable surface 24 as shown in FIGS. 12 and 13 (showing rear and front perspective views of an exemplary embodiment of covering 10) moveable between at least two positions: an open position (where the moveable surface 24 is moved away from a particular location of the covering 10 or device 110, 120), and a closed position (where the moveable surface is moved towards or touches a particular location of the covering 10 or device 110, 120). One or more NFC devices 950 may be attached to the moveable surface 24. The moveable surface 24 may comprise a strap or moveable panel, attached at one end to an end or side of covering 10. The moveable surface 24 may be hinged or attached by any pivotable or rotatable mechanism to the covering 10. The moveable surface 24 may comprise a panel that may substantially cover a side of the device 110, 120 when moved to such a position. In operation, device 110, 120 may be placed inside the covering, and may be configured to execute a command based on the determined orientation of the device only when moveable surface 24 is moved such that a NFC device 950 is brought within proximity of a corresponding antenna 8132b of the device 110, 120, preferably such that the moveable surface 24 is in its closed position. Optionally, the location of the NFC device 950 in the moveable surface 24 may be offset from the center of the covering 10 so that the NFC device 950 in the moveable surface 24 may also be used by the device 110, 120 to determine the orientation of the device 110, 120 optionally together with data read from any other NFC devices 950 in the covering 10. The moveable surface 24 may also include a magnet for attraction with a corresponding magnet 26 in a side 14, 16 of the covering 10 when moving the respective magnets in close proximity with one another. When held in place by magnetic force, a NFC device 950 in the moveable surface 24 may be in an approximate location that is known to the device 110, 120, and can therefore be used to determine the orientation of the device 110, 120 within the covering 10. The magnet 26 of the covering 10 may also be detected by sensor 8134, 726, or magnet 8135, 724 of device 110, 120 to determine an orientation of the device 110, 120 within the covering 10, particularly if the magnet 26 in the covering 10 is offset from the center of the covering 10.

As shown in FIG. 10, covering 10 may include a clip 22 for use in releasably securing the covering 10. The clip 22 may be used to secure the covering 10 to a belt, strap, or other item worn or carried by a user of the device 110, 120. The clip 22 may also help to define the front and rear sides 14 and 16 of the covering 10 as the clip 22 may be preferably located at the rear side 14 of the covering 10. A NFC device 950 may also be attached to the clip 22 for detection by the NFC subsystem 8132 of the device 110, 120 to aid in determining the orientation of the device 110, 120 within the covering.

Optionally, one side 14, 16 of covering 10 may not be present. In such case, the implementations described where the NFC device(s) 950 are present only in one side 14, 16 of the device 950 may still be implemented. NFC device(s) 950 may also be attached to the bottom end 18 of the covering 10 for detecting by the NFC subsystem 8132 upon covering of the device 110, 120 by the covering 10.

In any of the implementations described, it may be possible to further determine the orientation of the device by using other subsystems or hardware components of the device 110, 120, such as a sensor 8134, 726, magnet 724, gyroscope 8240, or GPS unit 8242. In particular, movements of the device 110, 120 may cause the respective gyroscope 8240 to also move. Accordingly, it may be possible for the device 110, 120 to determine whether it is bottom side up, or top side up while covered in the covering 10 through a combination of the gyroscope 8240 and NFC data transfers between the NFC subsystem 8132 and NFC device 950 of the covering 10. For example, upon detecting a NFC device 950 through NFC subsystem 8132 or determining that the device 110, 120 is covered within the covering 10, the device 110, 120 may be configured to receive data from the gyroscope 8240 to determine the up/down orientation of the device 110, 120 within the covering 10. This may be particularly useful for implementations of the covering 10 and device 110, 120 that is not otherwise capable of determining an up/down orientation of the device 110, 120 within the covering 10.

Optionally, GPS 8242 of device 110, 120 may be used together with the NFC devices 950 and NFC subsystem 8132 to determine the orientation of the device 110, 120, as GPS 8242 may be used to determine the location of the device 110, 120. If the location of the covering 10 can also be identified, then it may be possible to determine when the device 110, 120 is covered by the covering 10 through the use of GPS. Upon making that determination, the NFC subsystem 8132 may be activated to attempt to detect NFC devices 950 at the covering 10.

Other ways of using GPS 8242, gyroscope 8240, sensors 8134, 726, or other sensors may also be possible together with a combination of a NFC device 950 attached to the covering 10 and an antenna 8132b connected to NFC subsystem 8132 in order to determine the orientation of the device 110, 120 within the covering 10.

In further aspects, the disclosure provides systems, devices, methods, and computer programming products, including non-transient machine-readable instruction sets, for use in implementing such methods and enabling control of mobile and other communication and computing devices.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A Near Field Communication (NFC) enabled case for holding an NFC-capable mobile device, the case comprising:

a plurality of NFC tags, each tag attached to the case proximate a respective face of the case, each of the plurality of NFC tags including a NFC-readable data storage device, the NFC-readable data storage device comprising persistent memory readable by the NFC-capable mobile device, the persistent memory comprising data stored therein, the data configured to enable a processor of the NFC-capable mobile device to:

determine, based at least partly on at least one data transfer between the NFC-capable mobile device and the NFC-readable data storage device resulting in identification of the respective face proximate the tag used for the at least one data transfer, an orientation of the NFC-capable mobile device within the case, the orientation indicating an up/down orientation and a front/rear orientation of the NFC-capable mobile device relative to the case; and based at least partly on the determined orientation of the NFC-capable mobile device within the case, execute a device control command.

2. The case of claim 1 wherein execution of the device control command modifies a function of at least one component of the NFC-capable mobile device.

3. The case of claim 2 wherein the function modification comprises modifying power delivered to the at least one component.

4. The case of claim 2 wherein the function modification comprises modifying a control function of the at least one component.

5. The case of claim 2 wherein the at least one component comprises at least one of an antenna, an output device, and a heat dissipation system.

6. The case of claim 2 wherein the at least one component comprises at least one of a plurality of output devices comprising at least one of a speaker, a light, and a display.

7. The case of claim 1 wherein execution of the device control command deactivates at least one higher-power antenna and activates at least one lower-power antenna of the NFC-capable mobile device.

8. The case of claim 1 wherein execution of the device control command modifies tuning of at least one antenna of the NFC-capable mobile device.

9. The case of claim 1 wherein execution of the device control command modifies an operational state of at least one heat dissipation system of the NFC-capable mobile device, the at least one heat dissipation system comprising at least one front heat pump disposed proximate a front face of the NFC-capable mobile device and at least one rear heat pump disposed proximate a rear face of the NFC-capable device, and the modification of the operational state comprises activating at least one of the heat pumps and deactivating another of the heat pumps.

10. The case of claim 1 wherein execution of the device control command activates a reflex LCD skin device of the NFC-capable mobile device to change a displayed color of the reflect LCD skin device based at least partly on the determined orientation of the NFC-capable mobile device.

11. A Near Field Communication (NFC)-capable mobile device comprising:
a housing;
at least one processor; and
at least one NFC communication system, comprising at least one antenna disposed in a known juxtaposition relative to the housing,
the processor configured to execute machine-readable instructions to cause the NFC-capable mobile device to:
determine an orientation of the NFC-capable mobile device within a NFC enabled case for holding the NFC-capable mobile device, the case having a plurality of NFC tags, each tag having at least one NFC-readable data storage device and being attached to the case proximate a respective face of the case, based at least partly on at least one data transfer between the NFC communication system and at least one of the plurality of NFC tags, the orientation indicating an up/down orientation and a front/rear orientation of the NFC-capable mobile device relative to the case; and based at least partly on the determined orientation execute a device control command.

12. The NFC-capable mobile device of claim 11 wherein the at least one NFC communication system comprises a plurality of antennas, at least one of the plurality of antennas is disposed proximate a front face of the NFC-capable mobile device, and at least one of the plurality of antennas is disposed proximate a rear face of the NFC-capable mobile device, wherein the orientation is determined based at least partly on the antenna used for the at least one data transfer.

13. The NFC-capable mobile device of claim 11 wherein the at least one antenna comprises a directional antenna.

14. The NFC-capable mobile device of claim 11 wherein the NFC-capable mobile device comprises a front face, and the at least one antenna is shielded for enabling the at least one data transfer in a generally frontwards facing direction of the NFC-capable mobile device.

15. The NFC-capable mobile device of claim 11 wherein the NFC-capable mobile device comprises a rear face, and the at least one antenna is shielded for enabling the at least one data transfer in a generally rearwards facing direction of the NFC-capable mobile device.

16. The NFC-capable mobile device of claim 11 wherein the orientation is determined based at least partly on:
at least one data transfer between the NFC communication system and at least one of the at least one NFC-readable data storage devices while the NFC-capable mobile device is only partially placed within the case; and
at least one data transfer between the NFC communication system and at least one of the at least one NFC-readable data storage devices while the NFC-capable mobile device is fully placed within the case.

17. The NFC-capable mobile device of claim 11 wherein the orientation is determined based at least partly on a measured duration of detection of the at least one NFC-readable data storage device by the NFC communication system.

18. The NFC-capable mobile device of claim 11 wherein the orientation is determined based at least partly on at least two detections of respective ones of the at least one NFC-readable data storage device by the NFC communication system, and on a measurement of elapsed time between the at least two detections.

19. A method, performed by at least one processor of a Near Field Communication (NFC)-capable mobile device, comprising:
determining, based at least partly on at least one data transfer between the NFC-capable mobile device and at least one NFC-readable data storage device, an orientation of the NFC-capable mobile device within a NFC enabled case for holding the NFC-capable mobile device, the case having a plurality of NFC tags, each NFC tag having at least one NFC-readable data storage device and being attached to the case proximate a respective face of the case, the orientation indicating an up/down orientation and a front/rear orientation of the NFC-capable mobile device relative to the case; and
based at least partly on the determined orientation of the NFC-capable mobile device within the cover case, executing a device control command.

20. The method of claim 19 wherein the orientation is determined based at least partly on:
at least one data transfer between a NFC communication system of the NFC-capable mobile device and at least one of the at least one NFC-readable data storage devices while the NFC-capable mobile device is only partially placed within the case; and at least one data transfer between the NFC communication system and at least one of the at least one NFC-readable data storage devices while the NFC-capable mobile device is fully placed within the case.

21. The method of claim 19 wherein the orientation is determined based at least partly on a measured duration of detection of the at least one NFC-readable data storage device by a NFC communication system of the NFC-capable mobile device.

22. The method of claim 19 wherein the orientation is determined based at least partly on at least two detections of respective ones of the at least one NFC-readable data storage device by a NFC communication system of the NFC-capable mobile device, and on a measurement of elapsed time between the at least two detections.

23. The method of claim 19 wherein execution of the device control command modifies a function of at least one component of the NFC-capable mobile device.

24. The method of claim 23 wherein the function modification comprises modifying power delivered to the at least one component.

25. The method of claim 23 wherein the function modification comprises modifying a control function of the at least one component.

26. The method of claim 23 wherein the at least one component comprises at least one of an antenna, an output device, and a heat dissipation system.

27. The method of claim 19 wherein execution of the device control command deactivates at least one higher-power antenna and activates at least one lower-power antenna of the NFC-capable mobile device.

28. The method of claim 19 wherein execution of the device control command modifies tuning of at least one antenna of the NFC-capable mobile device.

* * * * *